US011018742B2

(12) United States Patent
John Wilson et al.

(10) Patent No.: US 11,018,742 B2
(45) Date of Patent: May 25, 2021

(54) DOWNLINK TRANSMISSION BEAM CONFIGURATION TECHNIQUES FOR WIRELESS COMMUNICATIONS

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Bilal Sadiq, Basking Ridge, NJ (US); Xiao Feng Wang, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/274,774

(22) Filed: Feb. 13, 2019

(65) Prior Publication Data

US 2019/0260445 A1 Aug. 22, 2019

Related U.S. Application Data

(60) Provisional application No. 62/710,409, filed on Feb. 16, 2018.

(51) Int. Cl.
*H04B 7/06* (2006.01)
*H04W 76/11* (2018.01)
(Continued)

(52) U.S. Cl.
CPC ......... *H04B 7/0617* (2013.01); *H04B 7/0404* (2013.01); *H04B 7/0486* (2013.01);
(Continued)

(58) Field of Classification Search
CPC .. H04B 7/0404; H04B 7/0486; H04B 7/0617; H04B 7/0626; H04B 7/0634; H04B 7/086; H04L 5/006; H04W 72/10; H04W 76/11
See application file for complete search history.

(56) References Cited

U.S. PATENT DOCUMENTS

2013/0121276 A1\* 5/2013 Kim ...................... H04L 5/0053
370/329
2017/0048740 A1\* 2/2017 Yang ........................ H04B 7/26
(Continued)

OTHER PUBLICATIONS

U.S. Appl. No. 62/615,157, filed 2018.\*
(Continued)

*Primary Examiner* — David B Lugo
(74) *Attorney, Agent, or Firm* — Holland & Hart LLP

(57) ABSTRACT

Methods, systems, and devices for wireless communications are described that provide for identification of beamforming parameters for a downlink transmission beam based at least in part on a set of rules that define a priority order for control transmission and data transmissions. Downlink resources may be allocated to a user equipment (UE) for a downlink transmission via a first set of downlink beamforming parameters, and the UE may also be configured to monitor a control resource set using a different set of downlink beamforming parameters within a same transmission time interval (TTI) as the downlink transmission. A UE and a base station may identify which beamforming parameters to use for the downlink transmission based on the priority order. The set of rules may define which set of downlink beamforming parameters are to be used, whether the downlink transmission is rate-matched around the control resource set, or combinations thereof.

68 Claims, 26 Drawing Sheets

(51) Int. Cl.
*H04B 7/0456* (2017.01)
*H04L 5/00* (2006.01)
*H04W 72/10* (2009.01)
*H04B 7/0404* (2017.01)
*H04B 7/08* (2006.01)

(52) U.S. Cl.
CPC ......... *H04B 7/0626* (2013.01); *H04B 7/0634* (2013.01); *H04B 7/086* (2013.01); *H04L 5/006* (2013.01); *H04L 5/0007* (2013.01); *H04W 72/10* (2013.01); *H04W 76/11* (2018.02)

(56) References Cited

U.S. PATENT DOCUMENTS

| | | | | |
|---|---|---|---|---|
| 2019/0098590 | A1* | 3/2019 | Nam | H04W 24/08 |
| 2019/0239245 | A1* | 8/2019 | Davydov | H04B 7/0626 |
| 2019/0253904 | A1* | 8/2019 | Tsai | H04W 16/14 |
| 2019/0393972 | A1* | 12/2019 | Pan | H04J 11/0069 |
| 2020/0068502 | A1* | 2/2020 | Mao | H04W 52/146 |
| 2020/0252951 | A1* | 8/2020 | Frenne | H04B 7/0617 |

OTHER PUBLICATIONS

U.S. Appl. No. 62/631,098, filed 2018.*
Chinese patent application CN 201710317493.5—English translation. (Year: 2017).*
"3rd Generation Partnership Project; Technical Specification Group Radio Access Network; NR; Physical Layer Procedures for Data (Release 15)", 3GPP Draft; R1-1801286 38.214 V15.0.1, Feb. 2, 2018, 3rd Generation Partnership Project (3GPP), Mobile Competence Centre, 650, Route Des Lucioles, F-06921 Sophia-Antipolis Cedex, France, Feb. 6, 2018 (Feb. 6, 2018), XP051398846, 73 Pages, Retrieved from the Internet:URL:http://www.3gpp.org/ftp/tsg%5Fran/WG1%5FRL1/TSGR1%5FAH/NR%5FAH%5F1801/Docs/ [retrieved on Feb. 6, 2018],Paragraphs [05.1], [5.1.2], [5.1.5].
Intel Corporation: "Resource Reservation for Forward Compatibility", 3GPP Draft; R1-1716337 Intel Reserved Resources, 3rd Generation Partnership Project (3GPP), Mobile Competence Centre ; 650, Route Des Lucioles ; F-06921 Sophia-Antipolis Cedex, France, vol. RAN WG1, No. Nagoya, Japan; Sep. 18, 2017-Sep. 21, 2017, Sep. 12, 2017 (Sep. 12, 2017), XP051329928, Retrieved from the Internet:URL:http://www.3gpp.org/ftp/tsg_ran/WG1_RL1/TSGR1_AH/NR_AH_1709/Docs/ [retrieved on—Sep. 12, 2017], p. 1, Paragraphs 2.2, 3—p. 4 Paragraph [0003].
Interdigital Communications: "Logical Channel Prioritization for NR", 3GPP Draft; R2-1702871 (R15 NR WI AI10315 MAC LCP Multiplexing), 3rd Generation Partnership Project (3GPP), Mobile Competence Centre ; 650, Route Des Lucioles ; F-06921 Sophia-Antipolis Cedex; France, vol. RAN WG2, No. Spokane, USA; Apr. 3, 2017-Apr. 7, 2017, Apr. 3, 2017 (Apr. 3, 2017), XP051244851, 4 Pages, Retrieved from the Internet:URL:http://www.3gpp.org/ftp/Meetings_3GPP_SYNC/RAN2/Docs/ [retrieved on Apr. 3, 2017], p. 1-p. 4.
International Search Report and Written Opinion—PCT/US2019/018084—ISA/EPO—May 14, 2019 (182096WO).

* cited by examiner

DOWNLINK TRANSMISSION BEAM CONFIGURATION TECHNIQUES FOR WIRELESS COMMUNICATIONS

CROSS REFERENCES

The present Application for Patent claims the benefit of U.S. Provisional Patent Application No. 62/710,409 by JOHN WILSON et al., entitled "DOWNLINK TRANSMISSION BEAM CONFIGURATION TECHNIQUES FOR WIRELESS COMMUNICATIONS," filed Feb. 16, 2018, assigned to the assignee hereof, and expressly incorporated herein.

BACKGROUND

The following relates generally to wireless communication, and more specifically to downlink transmission beam configuration techniques for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support downlink transmission beam configuration techniques for wireless communications. Generally, the described techniques provide for identification of beamforming parameters for a downlink transmission beam and corresponding receive beam parameters for receiving the downlink transmission beam based at least in part on a set of rules that define a priority order for control transmission and data transmissions. In some cases, downlink resources may be allocated to a user equipment (UE) for a downlink transmission via a first set of downlink beamforming parameters, and the UE may also be configured to monitor a control resource set using a different set of downlink beamforming parameters within a same transmission time interval (TTI) as the downlink transmission. A UE and a base station may identify which beamforming parameters to use for the downlink transmission based on the priority order. In some cases, the set of rules define which set of downlink beamforming parameters are to be used for spatial receive beam filtering, define whether the downlink transmission is rate-matched around the control resource set, or combinations thereof.

A method of wireless communication is described. The method may include receiving, at a UE, a downlink grant from a base station, the downlink grant indicating a first set of beamforming parameters to be used by the UE for receiving a downlink transmission via a downlink transmission beam from the base station during a first TTI, determining, based on the first set of beamforming parameters and a second set of beamforming parameters, a priority order associated with the downlink transmission and a control resource set of the first TTI, and receiving, based on the priority order, at least one of the downlink transmission using the first set of beamforming parameters or the control resource set using the second set of beamforming parameters.

An apparatus for wireless communication is described. The apparatus may include a processor, memory in electronic communication with the processor, and instructions stored in the memory. The instructions may be executable by the processor to cause the apparatus to receive, at a UE, a downlink grant from a base station, the downlink grant indicating a first set of beamforming parameters to be used by the UE for receiving a downlink transmission via a downlink transmission beam from the base station during a first TTI, determine, based on the first set of beamforming parameters and a second set of beamforming parameters, a priority order associated with the downlink transmission and a control resource set of the first TTI, and receive, based on the priority order, at least one of the downlink transmission using the first set of beamforming parameters or the control resource set using the second set of beamforming parameters.

Another apparatus for wireless communication is described. The apparatus may include means for receiving, at a UE, a downlink grant from a base station, the downlink grant indicating a first set of beamforming parameters to be used by the UE for receiving a downlink transmission via a downlink transmission beam from the base station during a first TTI, determining, based on the first set of beamforming parameters and a second set of beamforming parameters, a priority order associated with the downlink transmission and a control resource set of the first TTI, and receiving, based on the priority order, at least one of the downlink transmission using the first set of beamforming parameters or the control resource set using the second set of beamforming parameters.

A non-transitory computer-readable medium storing code for wireless communication is described. The code may include instructions executable by a processor to receive, at a UE, a downlink grant from a base station, the downlink grant indicating a first set of beamforming parameters to be used by the UE for receiving a downlink transmission via a downlink transmission beam from the base station during a first TTI, determine, based on the first set of beamforming parameters and a second set of beamforming parameters, a priority order associated with the downlink transmission and a control resource set of the first TTI, and receive, based on the priority order, at least one of the downlink transmission using the first set of beamforming parameters or the control resource set using the second set of beamforming parameters.

Some examples of the method, apparatuses, and non-transitory computer-readable medium described herein may further include operations, features, means, or instructions for determining that the control resource set may be to be monitored during at least a portion of the first TTI using the second set of beamforming parameters.

In some examples of the method, apparatuses, and non-transitory computer-readable medium described herein, receiving at least one of the downlink transmission or the control resource set may include operations, features, means, or instructions for ignoring the downlink grant and receiving the control resource set based on the priority order.

In some examples of the method, apparatuses, and non-transitory computer-readable medium described herein, the priority order may be determined based on a radio network temporary identifier (RNTI) that may be monitored by the UE.

In some examples of the method, apparatuses, and non-transitory computer-readable medium described herein, the priority order may be determined based on at least one of one or more downlink resources for the downlink transmission and at least one of one or more downlink resources of the control resource set residing within a same orthogonal frequency division multiplexing (OFDM) symbol.

In some examples of the method, apparatuses, and non-transitory computer-readable medium described herein, the priority order indicates that the control resource set may have a higher priority than the downlink transmission.

In some examples of the method, apparatuses, and non-transitory computer-readable medium described herein, the priority order indicates that the control resource set may have the higher priority based on a quality of service (QoS) associated with the control resource set having a higher priority than the downlink transmission, and where the QoS associated with the control resource set may be an ultra-reliable low latency communication (URLLC) QoS, and where a QoS associated with the downlink transmission may have a lower priority than the URLLC QoS.

Some examples of the method, apparatuses, and non-transitory computer-readable medium described herein may further include operations, features, means, or instructions for determining that the first set of beamforming parameters or the second set of beamforming parameters may be to be used for spatial receive beam filtering.

Some examples of the method, apparatuses, and non-transitory computer-readable medium described herein may further include operations, features, means, or instructions for determining whether the downlink transmission may be rate-matched around the control resource set.

In some examples of the method, apparatuses, and non-transitory computer-readable medium described herein, when the downlink transmission may be rate-matched around the control resource set, receiving at least one of the downlink transmission or the control resource set may include operations, features, means, or instructions for monitoring the control resource set using the first set of beamforming parameters, and receiving the downlink transmission using the first set of beamforming parameters.

In some examples of the method, apparatuses, and non-transitory computer-readable medium described herein, receiving at least one of the downlink transmission or the control resource set may include operations, features, means, or instructions for identifying a subset of resources within the first TTI that may be configured for transmitting the control resource set, and receiving the downlink transmission during the first TTI using the subset of resources that may be configured for transmitting the control resource set.

In some examples of the method, apparatuses, and non-transitory computer-readable medium described herein, the priority order may be determined based on one or more of a type of transmission associated with the control resource set, frequency division multiplexing between downlink resources for the downlink transmission and downlink resources of the control resource set, a capability of the UE to concurrently receive multiple transmission beams, or any combination thereof.

Some examples of the method, apparatuses, and non-transitory computer-readable medium described herein may further include operations, features, means, or instructions for identifying two or more different control resource sets configured by the base station, each of the two or more different control resource sets having a different priority in the priority order.

In some examples of the method, apparatuses, and non-transitory computer-readable medium described herein, a first control resource set of the two or more different control resource sets corresponds to transmissions of an ultra-reliable low latency communication (URLLC) service and may have a higher priority than the downlink transmission, and a second control resource set of the two or more different control resource sets corresponds to transmissions of an enhanced mobile broadband (eMBB) service and may have a lower priority than the downlink transmission.

Some examples of the method, apparatuses, and non-transitory computer-readable medium described herein may further include operations, features, means, or instructions for identifying an aperiodic channel state information reference signal (CSI-RS) configuration within the first TTI with a third set of beamforming parameters, disregarding the aperiodic CSI-RS configuration, and receiving the downlink transmission using the first set of beamforming parameters during the first TTI.

Some examples of the method, apparatuses, and non-transitory computer-readable medium described herein may further include operations, features, means, or instructions for identifying a third set of beamforming parameters for monitoring a transmission beam that includes a remaining system information (RMSI) control resource set, and monitoring for the downlink transmission using the third set of beamforming parameters when a search space for the RMSI control resource set overlaps with the first TTI.

In some examples of the method, apparatuses, and non-transitory computer-readable medium described herein, a set of rules defining the priority order may be statically defined at the UE.

In some examples of the method, apparatuses, and non-transitory computer-readable medium described herein, a set of rules defining the priority order may be received semi-statically via radio resource control signaling.

A method of wireless communication is described. The method may include transmitting a downlink grant to a UE, the downlink grant indicating a first set of beamforming parameters to be used by the UE for receiving a downlink transmission via a downlink transmission beam during a first TTI, determining, based on the first set of beamforming parameters and a second set of beamforming parameters, a priority order associated with the downlink transmission and a control resource set of the first TTI, and transmitting, based on the priority order, at least one of the downlink transmission using the first set of beamforming parameters or the control resource set using the second set of beamforming parameters.

An apparatus for wireless communication is described. The apparatus may include a processor, memory in electronic communication with the processor, and instructions stored in the memory. The instructions may be executable by the processor to cause the apparatus to transmit a downlink grant to a UE, the downlink grant indicating a first set of beamforming parameters to be used by the UE for receiving a downlink transmission via a downlink transmission beam during a first TTI, determine, based on the first set of beamforming parameters and a second set of beamforming parameters, a priority order associated with the downlink transmission and a control resource set of the first TTI, and transmit, based on the priority order, at least one of the downlink transmission using the first set of beamforming parameters or the control resource set using the second set of beamforming parameters.

Another apparatus for wireless communication is described. The apparatus may include means for transmitting a downlink grant to a UE, the downlink grant indicating a first set of beamforming parameters to be used by the UE for receiving a downlink transmission via a downlink transmission beam during a first TTI, determining, based on the first set of beamforming parameters and a second set of beamforming parameters, a priority order associated with the downlink transmission and a control resource set of the first TTI, and transmitting, based on the priority order, at least one of the downlink transmission using the first set of beamforming parameters or the control resource set using the second set of beamforming parameters.

A non-transitory computer-readable medium storing code for wireless communication is described. The code may include instructions executable by a processor to transmit a downlink grant to a UE, the downlink grant indicating a first set of beamforming parameters to be used by the UE for receiving a downlink transmission via a downlink transmission beam during a first TTI, determine, based on the first set of beamforming parameters and a second set of beamforming parameters, a priority order associated with the downlink transmission and a control resource set of the first TTI, and transmit, based on the priority order, at least one of the downlink transmission using the first set of beamforming parameters or the control resource set using the second set of beamforming parameters.

Some examples of the method, apparatuses, and non-transitory computer-readable medium described herein may further include operations, features, means, or instructions for determining that the control resource set may be to be transmitted during at least a portion of the first TTI using the second set of beamforming parameters.

In some examples of the method, apparatuses, and non-transitory computer-readable medium described herein, transmitting at least one of the downlink transmission or the control resource set may include operations, features, means, or instructions for skipping transmission of the downlink grant and transmitting the control resource set based on the priority order.

In some examples of the method, apparatuses, and non-transitory computer-readable medium described herein, the priority order may be determined based on a radio network temporary identifier (RNTI) that may be to be monitored by the UE.

In some examples of the method, apparatuses, and non-transitory computer-readable medium described herein, the priority order may be determined based on at least one of one or more downlink resources for the downlink transmission and at least one of one or more downlink resources of the control resource set residing within a same orthogonal frequency division multiplexing (OFDM) symbol.

In some examples of the method, apparatuses, and non-transitory computer-readable medium described herein, the priority order indicates that the control resource set may have a higher priority than the downlink transmission.

In some examples of the method, apparatuses, and non-transitory computer-readable medium described herein, the priority order indicates that the control resource set may have the higher priority based on a quality of service (QoS) associated with the control resource set having a higher priority than the downlink transmission, and where the QoS associated with the control resource set may be an ultra-reliable low latency communication (URLLC) QoS, and where a QoS associated with the downlink transmission may have a lower priority than the URLLC QoS.

Some examples of the method, apparatuses, and non-transitory computer-readable medium described herein may further include operations, features, means, or instructions for determining that the first set of beamforming parameters or the second set of beamforming parameters may be to be used for spatial receive beam filtering.

Some examples of the method, apparatuses, and non-transitory computer-readable medium described herein may further include operations, features, means, or instructions for determining whether the downlink transmission may be to be rate-matched around the control resource set.

In some examples of the method, apparatuses, and non-transitory computer-readable medium described herein, when the downlink transmission may be rate-matched around the control resource set, the method further may include operations, features, means, or instructions for transmitting the control resource set using the first set of beamforming parameters.

In some examples of the method, apparatuses, and non-transitory computer-readable medium described herein, the transmitting at least one of the downlink transmission or the control resource set may include operations, features, means, or instructions for skipping transmission of the control resource set, and transmitting the downlink transmission using resources within the first TTI that may be configured for transmitting the control resource set.

In some examples of the method, apparatuses, and non-transitory computer-readable medium described herein, the priority order may be determined based on one or more of a type of transmission associated with the control resource set, frequency division multiplexing between downlink resources for the downlink transmission and resources of the control resource set, a capability of the UE to concurrently receive multiple transmission beams, or any combination thereof.

Some examples of the method, apparatuses, and non-transitory computer-readable medium described herein may further include operations, features, means, or instructions for identifying two or more different control resource sets having a different priority in the priority order.

In some examples of the method, apparatuses, and non-transitory computer-readable medium described herein, a first control resource set of the two or more different control resource sets corresponds to transmissions of an ultra-reliable low latency communication (URLLC) service and may have a higher priority than the downlink transmission, and a second control resource set of the two or more different control resource sets corresponds to transmissions of an enhanced mobile broadband (eMBB) service and may have a lower priority than the downlink transmission.

Some examples of the method, apparatuses, and non-transitory computer-readable medium described herein may further include operations, features, means, or instructions for identifying an aperiodic CSI-RS configuration within the first TTI with a third set of beamforming parameters, disregarding the aperiodic CSI-RS configuration, and transmitting the downlink transmission using the first set of beamforming parameters during the first TTI.

Some examples of the method, apparatuses, and non-transitory computer-readable medium described herein may further include operations, features, means, or instructions for identifying a third set of beamforming parameters for a transmission beam that includes a remaining system information (RMSI) control resource set, and transmitting the downlink transmission using the third set of beamforming parameters when a search space for the RMSI control resource set overlaps with the first TTI.

In some examples of the method, apparatuses, and non-transitory computer-readable medium described herein, a set of rules defining the priority order may be statically defined or may be transmitted semi-statically via radio resource control signaling.

DETAILED DESCRIPTION

Figure 1:
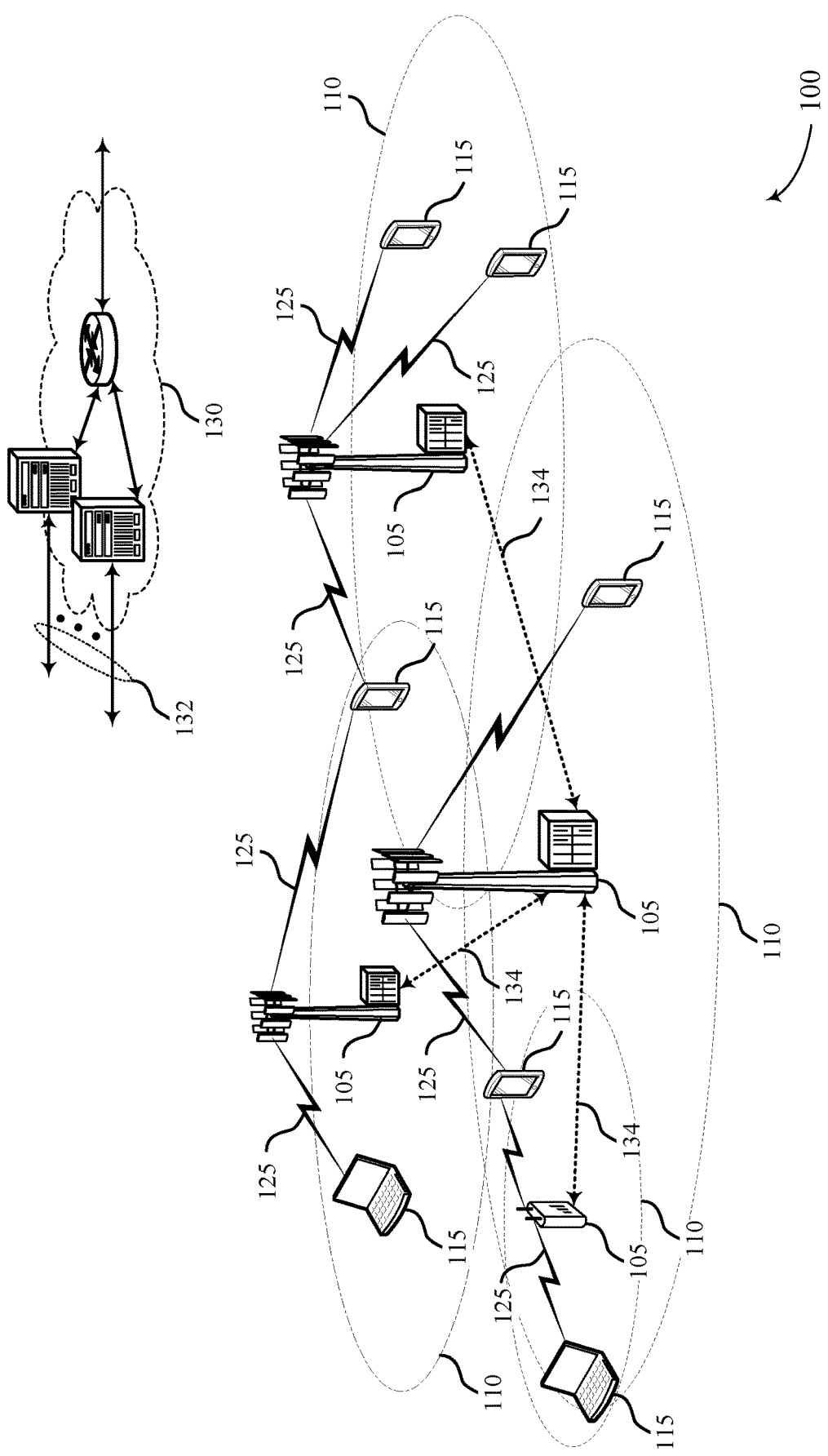
FIG. 1 illustrates an example of a wireless communications system that supports downlink transmission beam configuration techniques for wireless communications in accordance with aspects of the present disclosure.

Various described techniques provide for identification of beamforming parameters for a downlink transmission beam based at least in part on a set of rules that define a priority order for control resource set (CORESET) transmission and allocated downlink data transmissions. In some cases, a user equipment (UE) may establish a connection with a base station, which may use a high-band component either alone or in conjunction with a low-band component. In various examples, the high-band component may use relatively high frequency bands, such as millimeter wave (mmW) frequency bands, that use beamforming techniques for transmission and reception of directional beams. Low-band component(s) may use relatively lower frequency bands, such as frequency bands below 6 GHz (which may be referred to as Sub-6 bands). While various techniques discussed herein relate to beamforming parameter selection and transmission beams using mmW frequency bands, it will be understood that such transmissions beams may be used alone or in conjunction with lower frequency band transmissions. Additionally, techniques provided herein may apply to non-mmW transmissions as well.

In some cases, downlink resources may be allocated to a UE for a downlink transmission via a first set of beamforming parameters, and the UE may also be configured to monitor a CORESET transmission using a different set of beamforming parameters within a same transmission time interval (TTI) as the downlink transmission. CORESET transmissions may be periodically transmitted by a base station, and may include control information, such as downlink control information (DCI). In some cases, two or more CORESETs may be configured that carry different types of DCI. A CORESET may include multiple resource blocks in the frequency domain, and may include n OFDM symbols in the time domain (where n is an integer). The CORESET may include a total set of resources allocated for control information, and in some examples may include one or more CCEs corresponding to a particular search candidate in one or more slots of a frame.

In some cases, a UE may receive a downlink grant that indicates downlink resources and a first set of beamforming parameters (e.g., downlink beamforming parameters) that overlap with a CORESET configuration where the UE may be configured to monitor a control resource set using a second, different set of beamforming parameters. For example, within a same transmission time interval (TTI), the UE may be configured to monitor one or more CORESETs and also have a downlink grant, where the monitoring of the one or more CORESETs and the downlink grant may be associated with different sets of beamforming parameters. In some cases, a UE may be capable of monitoring two transmission beams concurrently, and may receive both the CORESET and the downlink transmission on different transmission beams. In other cases, a UE may not have a capability to receive concurrent transmission beams or may not be capable of switching between different downlink transmission beams fast enough to receive both the CORESET transmission and the downlink transmission. In such cases, the UE and the base station may identify which set of beamforming parameters to use for the downlink transmission based on a set of rules that define a priority order. In some cases, the set of rules may define behavior of the base station and UE by providing, to name just a few examples, a default beam that is to be monitored by the UE and which set of beamforming parameters are to be used for spatial receive beam filtering, whether the downlink transmission is rate-matched around the CORESET, reference signal transmission behavior, search space configurations, or combinations thereof.

In one specific new radio (NR) example, a UE may be configured with the higher layer parameter to assume whether a transmission configuration indicator (TCI) is present in downlink DCI. For example, if a parameter TCI-PresentInDCI is set as 'Enabled' for the CORESET scheduling a physical downlink shared channel (PDSCH) transmission, the UE may assume that a TCI field is present in the downlink DCI of the physical downlink control channel (PDCCH) transmitted on the CORESET. If the parameter TCI-PresentInDCI is set as 'Disabled' for the CORESET scheduling the PDSCH, which may be used to determine PDSCH antenna port quasi co-location (QCL), also referred to as beamforming parameters, the UE may assume that the TCI state for the PDSCH is identical with the TCI state applied for the CORESET used for the PDCCH transmission. In such cases, if the parameter TCI-PresentInDCI is set as 'Enabled', the UE uses the TCI-States according to the value of the TCI field in the detected PDCCH with DCI for determining PDSCH antenna port quasi co-location. The UE may assume that the antenna ports of one demodulation reference signal (DM-RS) port group of PDSCH of a serving cell are quasi co-located with the reference signal(s) in the reference signal set with respect to the QCL type parameter(s) given by the indicated TCI state if the offset between the reception of the DL DCI and the corresponding PDSCH is equal to or greater than a threshold $k_0$. For both the case when TCI-PresentInDCI is 'Enabled' and TCI-PresentInDCI is 'Disabled,' if the offset is less than the threshold, the UE may assume that the antenna ports of one demodulation reference signal (DMRS) port group of PDSCH of a serving cell are quasi co-located based on the TCI state used for PDCCH quasi-colocation indication of the lowest CORESET-ID in the latest slot in which one or more CORESETs are configured for the UE.

In such cases, if a DCI in slot n schedules a PDSCH in slot n+1 with a Beam A (TCI state), and the UE is configured to monitor a CORESET in slot n+1 with a different Beam (Beam B), the defined set of rules that established a priority order for downlink transmissions may be used by the UE to determine which beam (i.e., Beam A or Beam B) is to be monitored, the information to be received on the beam, rate matching behavior, or any combination thereof. In some cases, the set of rules defines the priority order as a function of CORESET Type (e.g., a CORESET for an ultra-reliable low latency communication (URLLC) transmission, a CORESET for an enhanced mobile broadband (eMBB), etc.), a monitored radio network temporary identifier (RNTI), or any combination thereof. In some cases, one or more of the priority rules may also be a function of UE capability (e.g., an ability of the UE to receive two beams simultaneously).

In some cases, the priority rules are statically configured. In other cases, the priority rules may be semi-statically configured via radio resource control (RRC) signaling. In one non-limiting example, the priority rules may define that PDSCH QCL has higher priority over CORESET, URLLC CORESET monitoring has higher priority over PDSCH reception (in which case a PDSCH grant is ignored), a CORESET of a higher priority service (e.g., based on a quality of service (QoS) parameter, a latency requirement, reliability requirement, or any combination thereof) has higher priority than a PDSCH reception of a lower priority service, or a lower priority CORESET, or any combination thereof.

While various examples provided herein discuss priority order for determining sets of beamforming parameters and monitoring CORESET and PDSCH transmissions, techniques described herein may be applied generally to any two channels (e.g., any two PDCCH or PDSCH channels) that may have associated beamforming parameters. Such techniques may allow a base station and a UE to transmit and receive downlink transmission beam transmissions in accordance with a priority of a service of a particular communication. Such priority rules may thus enhance network efficiency through prioritization of different types of downlink transmissions. Such priority rules may also provide efficient determination by base stations and UEs for which particular downlink transmissions may be monitored and resources on which the transmissions may be monitored.

Aspects of the disclosure are initially described in the context of a wireless communications system. Various aspects of beamforming parameters and associated priority orders are then discussed. Aspects of the disclosure are further illustrated by and described with reference to apparatus diagrams, system diagrams, and flowcharts that relate to downlink transmission beam configuration techniques for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may use directional transmission beams, and one or more beam parameters for a downlink transmission beam within a TTI that includes a PDSCH transmission and CORESET transmission may be determined based at least in part on a set of priority rules as discussed in various examples herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe, or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, a UE may receive a physical downlink control channel (PDCCH) and a corresponding physical downlink shared channel (PDSCH). The PDCCH may be transmitted on a control resource set (CORESET) and may include transmission configuration indication (TCI) state information. The UE may automatically assume that the TCI state of the CORESET used for the PDCCH transmission is the same as the TCI state of the PDSCH transmission. This assumption, however, may limit system flexibility.

In accordance with the techniques described herein, a base station 105 may allocate downlink resources to a UE 115 for a downlink transmission via a first set of beamforming parameters, and the UE 115 may also be configured to monitor a CORESET transmission using a different set of beamforming parameters (e.g., a second set of downlink beamforming parameters) within a same transmission time interval (TTI) as the downlink transmission. The UE 115 and the base station 105 may identify which set of beamforming parameters to use for the downlink transmission based on a set of rules that define a priority order for the downlink transmission and CORESET transmissions. In some cases, the set of rules may define behavior of the base station 105 and UE 115 by providing, for example, a default beam that is to be monitored by the UE and which set of downlink beamforming parameters are to be used for spatial receive beam filtering, whether the downlink transmission is rate-matched around the CORESET, reference signal transmission behavior, search space configurations, or combinations thereof.

Figure 2:
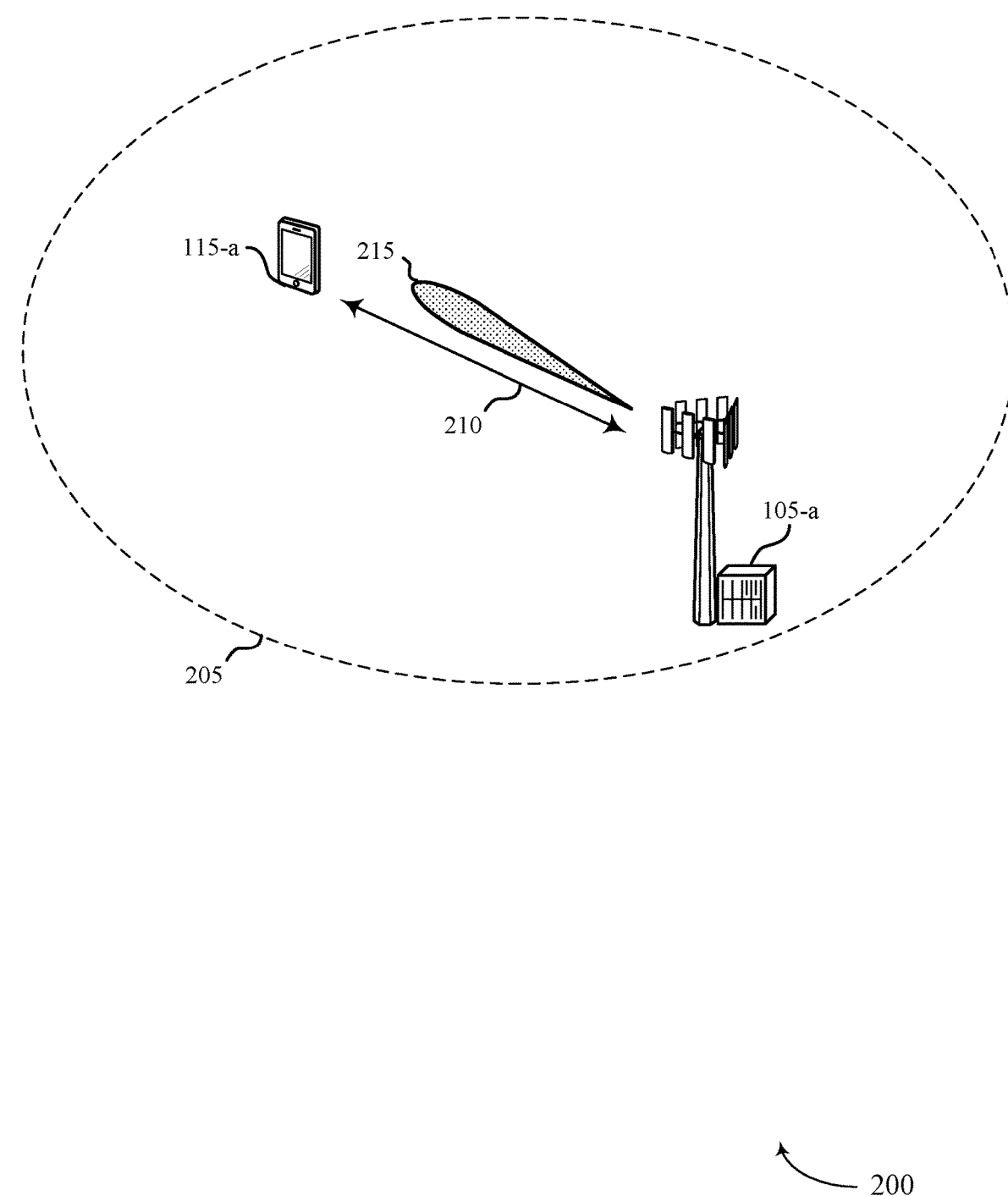
FIG. 2 illustrates an example of a portion of a wireless communication system that supports downlink transmission beam configuration techniques for wireless communications in accordance with aspects of the present disclosure.

FIG. 2 illustrates an example of a portion of a wireless communication system 200 that supports downlink transmission beam configuration techniques for wireless communications in accordance with various aspects of the present disclosure. In some examples, wireless communication system 200 may implement aspects of wireless communication system 100. In the example of FIG. 2, the wireless communication system 200 may include a base station 105-a, which may be an example of base stations 105 of FIG. 1. The wireless communications system 200 may also include a UE 115-a, which may be an example of UEs 115 of FIG. 1. In some cases, wireless communications system 200 may operate in mmW spectrum, or using NR technologies.

In this example, the base station 105-a may have a geographic coverage area 205, and may establish a first connection 210 with the UE 115-a in which downlink transmissions may be transmitted from base station 105-a via a transmission beam 215, which may be a high-band connection using beamformed mmW frequencies. Of course, other examples may use different frequency bands, combinations of frequency bands, combinations of carriers, or combinations thereof. Uplink transmissions from the UE 115-a to the base station 105-a may be via an uplink transmission beam, via one or more low-band (e.g., sub-6 GHz band) connections, or combinations thereof. As indicated above, in some cases, the base station 105-a may configure periodic CORESET transmissions that may use a first set of beamforming parameters. In some cases, for instance where the UE 115-a is allocated with downlink resources that overlap with a CORESET transmission (e.g., within a same TTI as a CORESET transmission), the UE 115-a and base station 105-a may use a defined set of rules to determine a priority order of transmission that are to be transmitted/received, and beamforming parameters associated with the transmissions. An example of a downlink transmission (e.g. a PSDCH transmission) that may have different beamforming parameters than an overlapping CORESET transmission is illustrated in FIG. 3.

Figure 3:
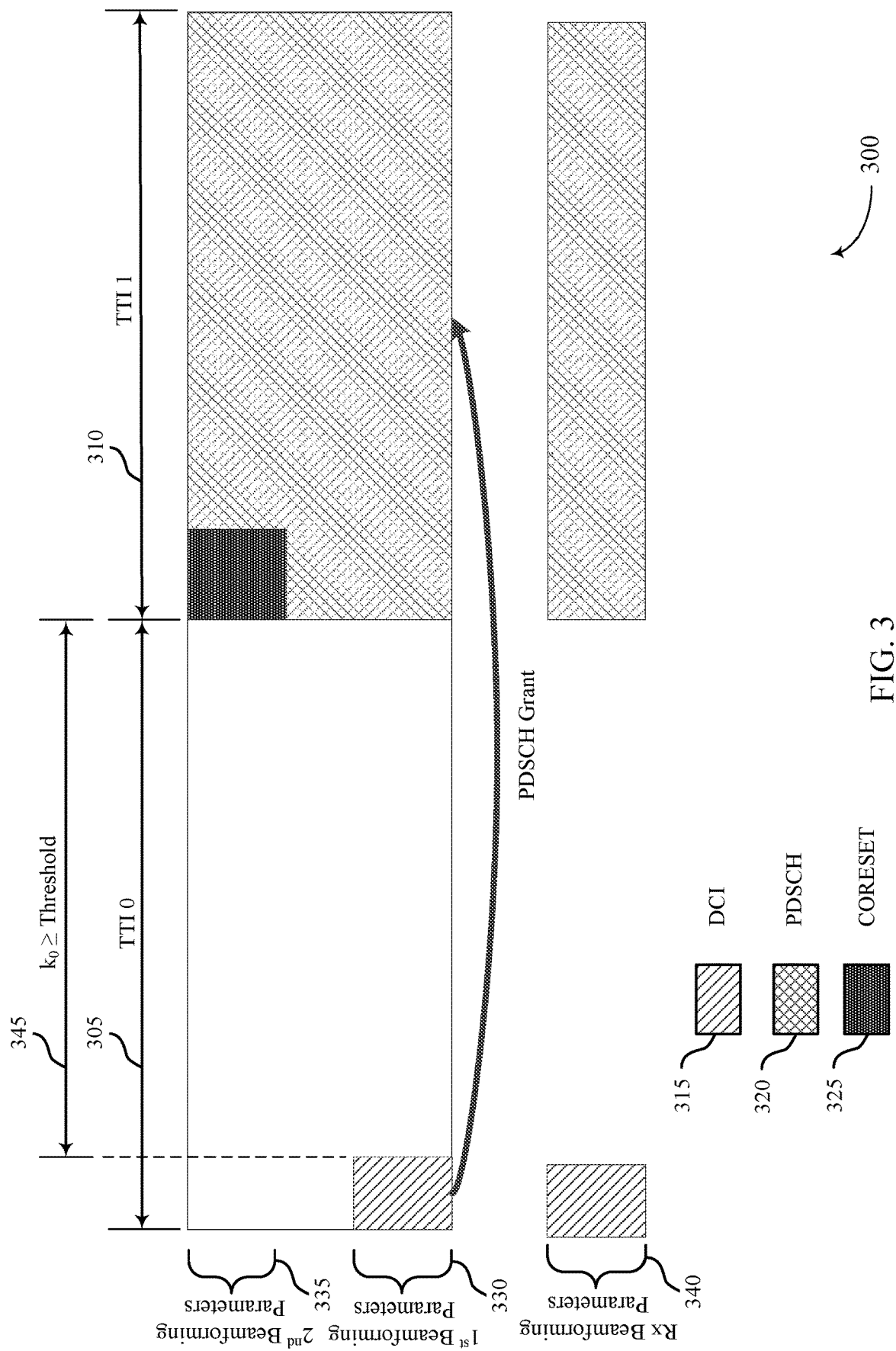
FIG. 3 illustrates an example of beamforming parameters that support downlink transmission beam configuration techniques for wireless communications in accordance with aspects of the present disclosure.

FIG. 3 illustrates an example of beamforming parameters 300 that support downlink transmission beam configuration techniques for wireless communications in accordance with various aspects of the present disclosure. In some examples, beamforming parameters 300 may be used to implement aspects of wireless communication system 100 or 200. In the example of FIG. 3, a DCI 315 may be transmitted in a first TTI 305 (TTI-0 in the example of FIG. 3), and may provide information to a UE 115 for a grant for PDSCH 320 in a second TTI 310 (TTI-1 in the example of FIG. 3).

In this example, the PDSCH 320 grant may indicate that a first set of beamforming parameters 330 are to be used for the downlink PDSCH 320 transmission. However, in this example, CORESET 325 may be configured such that the UE 115 may monitor downlink transmissions for the CORESET 325 using a second set of beamforming parameters 335 that are different than the first set of beamforming parameters 330. The UE 115 may receive the second set of beamforming parameters 335 via semi-statically signaling, such as RRC signaling or DCI signaling. Additionally or alternatively, the UE 115 may receive the second set of beamforming parameters 335 dynamically. In some cases, for example, as illustrated in FIG. 3, the CORESET 325 and PDSCH 320 may be in the same TTI (e.g., TTI-1). Further, the UE 115 may use receive beamforming parameters 340 that are determined based on a set of rules that define a priority order for which beamforming parameters to use (e.g., whether to use the first set of beamforming parameters 330 or the second set of beamforming parameters 335), and which downlink transmissions to monitor.

In some cases, a set of priority rules may be defined to identify the default beam (or spatial receive filtering parameters) in a symbol to avoid conflict when a scheduled PDSCH 320 has a same or different spatial QCL in the symbol compared to a spatial QCL of the CORESET 325. In some cases, the priority rules may also encompass rate-matching behavior. Such priority rules may provide a priority order for QCL assumption, rate matching, or both, between CORESET 325 monitoring versus the PDSCH 320 grant. In some cases, the priority rules may be a function of CORESET 325 type (e.g., a service that the CORESET 325 configures, such as a URLLC or eMBB service), an RNTI monitored at the UE, whether the PDSCH 320 is frequency division multiplexed partially or completely with CORESET 325, or any combinations thereof. The priority rules may also be a function of UE capability (e.g., an ability of the UE 115 to receive two beams simultaneously). As indicated above, in some cases, such priority rules may be statically configured at the UE 115 and the base station 105. In other cases, the priority rules, or an indication of which of a number of different configured priority rule sets may be semi-statically configured and signaled to the UE 115 via, for example, RRC signaling.

In some cases, the priority rules may provide that the QCL associated with PDSCH 320 QCL has a higher priority over the QCL associated with CORESET 325. Additionally or alternatively, the priority rules may define that URLLC CORESET monitoring has higher priority over PDSCH reception. In such cases, if the CORESET 325 is associated with one or more URLLC transmissions (or other transmissions that have a higher priority, or higher QoS than the PDSCH 320, where examples of QoS may include latency requirements, reliability requirements, etc.), the UE 115 may ignore the grant for PDSCH 320, and monitor the CORESET 325 using the second beamforming parameters 335.

As indicated above, in some cases, the UE 115 may assume that the antenna ports of one DMRS port group of PDSCH 320 of a serving cell are quasi co-located with the reference signal(s) in the reference signal set with respect to the QCL type parameter(s) given by the indicated TCI state, if the offset between the reception of the downlink DCI 315 and the corresponding PDSCH 320 is equal to or greater than a threshold 345 ($k_0$). In such cases, if the PDSCH 320 is associated with a same priority as, or higher priority than, the CORESET (and $k_0$ is greater than or equal to the threshold value) the UE 115 may follow the PDSCH 320 grant and monitor the downlink transmission using the first set of beamforming parameters 330 and disregard the monitor CORESET 325. In some cases, the base station 105 may reuse the resources that were previously associated with CORESET 325, for data transmissions. In some cases, and as indicated above, the priority rules may configure the UE 115 to ignore the PDSCH grant in DCI 315 if the CORESET 325 is associated with URLLC traffic. In such cases, the UE 115 may ignore the DCI 315 grant and use the second beamforming parameters 335 to monitor the URLLC CORESET 325, for example, by using a receive beam associated with a TCI state belonging to the lowest URLLC CORESET ID.

In some other cases, the CORESET 325 may not be monitored by the UE 115. In yet other cases, the UE 115 may monitor the CORESET 325, but with a QCL assumption and using a first set of beamforming parameters 330 from the grant associated with PDSCH 320. In some cases, a priority rule may be established between QCL assumptions between different signals when they conflict with each other. In one example, such as when control and data cannot be simultaneously received using the same receive Beam, or if the offset ($k_0$)>threshold, or if data and control resources overlap/FDM in a same slot, or a combination thereof, the UE 115 may use the QCL assumption from the DCI 315 (i.e., associated with data) to receive the PDSCH 320. In some circumstances, the UE 115 may not monitor the CORESET 325 that overlaps with resources used for PDSCH 320 in the control region. (i.e., CORESET 325 is not rate-matched around to receive PDSCH 320); except that when CORESET 325 is associated with a higher layer parameter (e.g., a URLLC CORESET). In such cases, the PDSCH grant may be considered invalid, and the UE 115 may monitor the CORESET 325 with its associated QCL.

In some cases, a TRP may configure a link (e.g., a URLLC link) that has a set of CORESETs with their own IDs, and the UE 115 may choose the lowest ID among the CORESETs for a configured link. For example, the priority rules may provide that the UE 115 receives PDSCH 320, associated with URLLC traffic, with QCL associated with lowest URRLC CORESET ID, when $k_0$ is less than the threshold.

In some cases, when the UE 115 cannot simultaneously receive the PDCCH and PDSCH using the same spatial filter, a priority order may be defined for determination of QCL parameters when unicast PDSCH and configured CORESET are frequency division multiplexed over the same OFDM symbol. In such cases, when receiving PDSCH conveying Msg4 of a Random Access Procedure, the UE 115 may assume that the DMRS port of PDSCH is QCL'ed with the SS/PBCH block the UE 115 selected for random access channel (RACH) association and transmission.

In some aspects, a priority rule may be defined when the UE 115 does not (or is incapable of) simultaneously receiving both PDCCH and PDSCH using the same spatial filter. In some cases, when a CORESET is associated with a URLLC QoS set via higher layer signaling, the UE 115 may monitor the CORESET with quasi co-location parameters associated with the configured TCI state for the CORESET.

In some cases, when unicast PDSCH is to be received by the UE 115 in the same OFDM symbol containing a search space associated with the CORESET, and when the CORESET is not associated with a URLLC QoS set via higher layer signaling, quasi-colocation parameters associated with the PDSCH may take precedence, the UE 115 may receive the PDSCH with its associated quasi co-location parameters. In such cases, the UE 115 may not be expected to monitor this CORESET for PDCCH. Additionally, the UE 115 may assume that no PDCCH is transmitted in the REs indicated for receiving unicast PDSCH conveyed by a PDCCH.

In some cases, such as when an aperiodic channel state information (CSI) reference signal (CSI-RS) and a PDSCH are FDM'ed in the same OFDM symbol, and the UE 115 may not simultaneously receive both PDSCH and CSI-RS using the same spatial filter, the UE 115 may not choose to receive or process the aperiodic CSI-RS. In some examples, when aperiodic CSI-RS is used with aperiodic reporting, the CSI-RS offset may be configured per resource set via the higher layer parameter AperiodicNZP-CSI-RS-TriggeringOffset. In some cases, the CSI-RS triggering offset may be measured in slots, and the UE 115 may not expect the transmission of an aperiodic CSI-RS prior to the OFDM symbol(s) carrying the triggering DCI. In some cases, when the spatial QCL assumptions of an aperiodic CSI-RS and a PDSCH mapped over the same OFDM symbol are different, and the UE 115 may not simultaneously receive both the PDSCH and CSI-RS using the same spatial filter, the UE 115 may not receive the Aperiodic CSI-RS.

Figure 4:
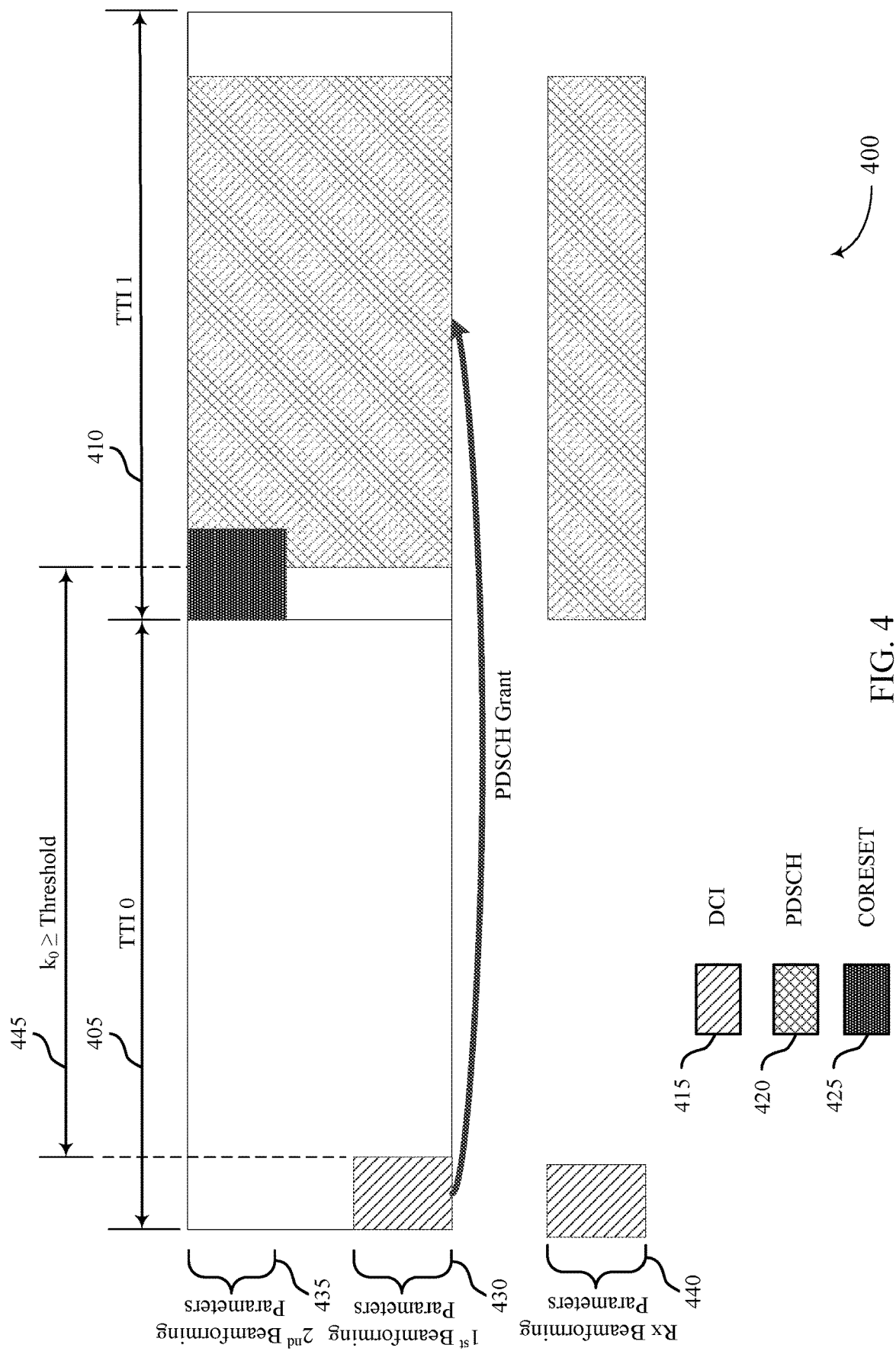
FIG. 4 illustrates another example of beamforming parameters that support downlink transmission beam configuration techniques for wireless communications in accordance with aspects of the present disclosure.

FIG. 4 illustrates an example of beamforming parameters 400 that support downlink transmission beam configuration techniques for wireless communications in accordance with various aspects of the present disclosure. In some examples, beamforming parameters 400 may be implemented in aspects of wireless communication system 100 or 200. In the example of FIG. 4, a DCI transmission 415 in a first TTI 405 (e.g., TTI-0 in the example of FIG. 4) may provide information to a UE 115 for a PDSCH 420 grant in a second TTI 410 (e.g., TTI-1 in the example of FIG. 4). In this example, the PDSCH 420 may start after a start of the CORESET 425, and thus, the CORESET 425 is partially FDM'ed with PDSCH 420.

In this example, the PDSCH 420 grant may indicate that a first set of beamforming parameters 430 are to be used for transmitting the downlink PDSCH 420 transmission. However, in this example, CORESET 425 may be configured such that the UE 115 may monitor for the CORESET 425 using a second set of beamforming parameters 435 that are different than the first set of beamforming parameters 430. In such cases, such as when CORESET 425 and PDSCH 420 are in a same TTI, the UE 115 may use receive beamforming parameters 440 that are determined based on a set of rules that define a priority order for which beamforming parameters to use and which downlink transmissions to monitor.

In some cases, a set of priority rules may be defined, based on which the UE 115 may monitor CORESET 425. In some aspects, the UE 115 may also assume that the portion of the CORESET 425 that overlaps with PDSCH 420 is punctured or rate-matched around. In some aspects, such a rule may support multiple modes of channel estimation for receiving the PDCCH. In other cases, the UE 115 may ignore the CORESET 425, unless the CORESET 425 is associated with a higher priority service than the PDSCH 420.

Figure 5:
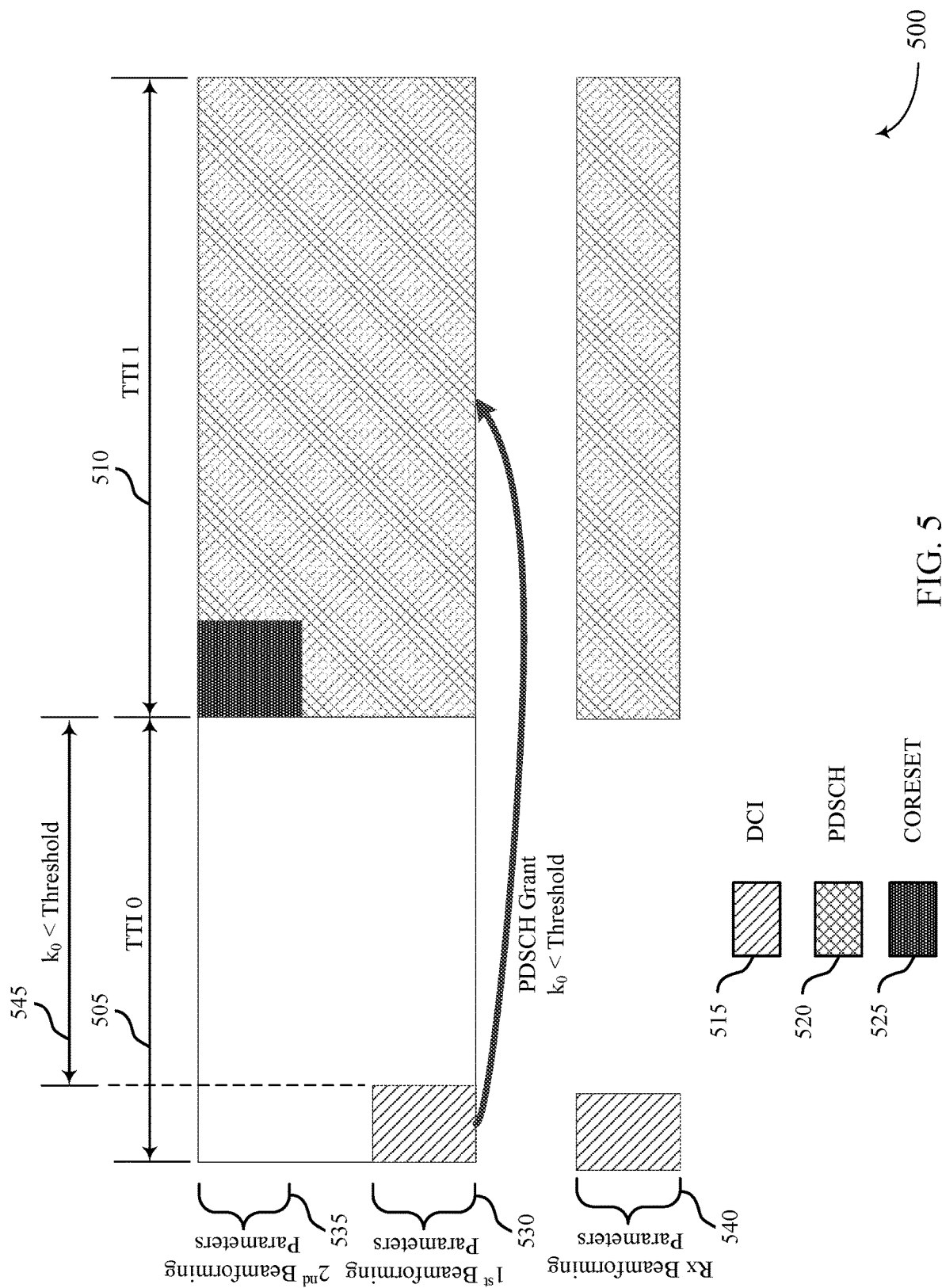
FIG. 5 illustrates another example of beamforming parameters that support downlink transmission beam configuration techniques for wireless communications in accordance with aspects of the present disclosure.

FIG. 5 illustrates another example of beamforming parameters 500 that support downlink transmission beam configuration techniques for wireless communications in accordance with various aspects of the present disclosure. In some examples, beamforming parameters 500 may be implemented in aspects of wireless communication system 100 or 200. In the example of FIG. 5, a DCI transmission 515 in a first TTI 505 (TTI-0 in the example of FIG. 5) may provide information to a UE 115 for a PDSCH 520 grant in a second TTI 510 (TTI-1 in the example of FIG. 5). In this example, the time difference (i.e., $k_0$ 545) between the DCI transmission 515 and the PDSCH 520 transmission may be less than the threshold.

In this example, the grant associated with PDSCH grant may indicate that a first set of beamforming parameters 530 are to be used for transmitting the downlink PDSCH 520 transmission. Further, in some cases, CORESET 525 may be configured such that the UE 115 may monitor for the CORESET 525 using a second set of beamforming parameters 535 that are different than the first set of beamforming parameters 530. In such cases, when the CORESET 525 and PDSCH 520 are in a same TTI, the UE 115 may use receive beamforming parameters 540 that are determined based on a set of rules that define a priority order for which beamforming parameters to use, and which downlink transmissions to monitor. In some cases, when the time $k_0$ is less than the threshold value, the priority rules may provide that the UE 115 receives PDSCH 320 associated with URLLC traffic with a QCL associated with the lowest URRLC CORESET ID.

Figure 6:
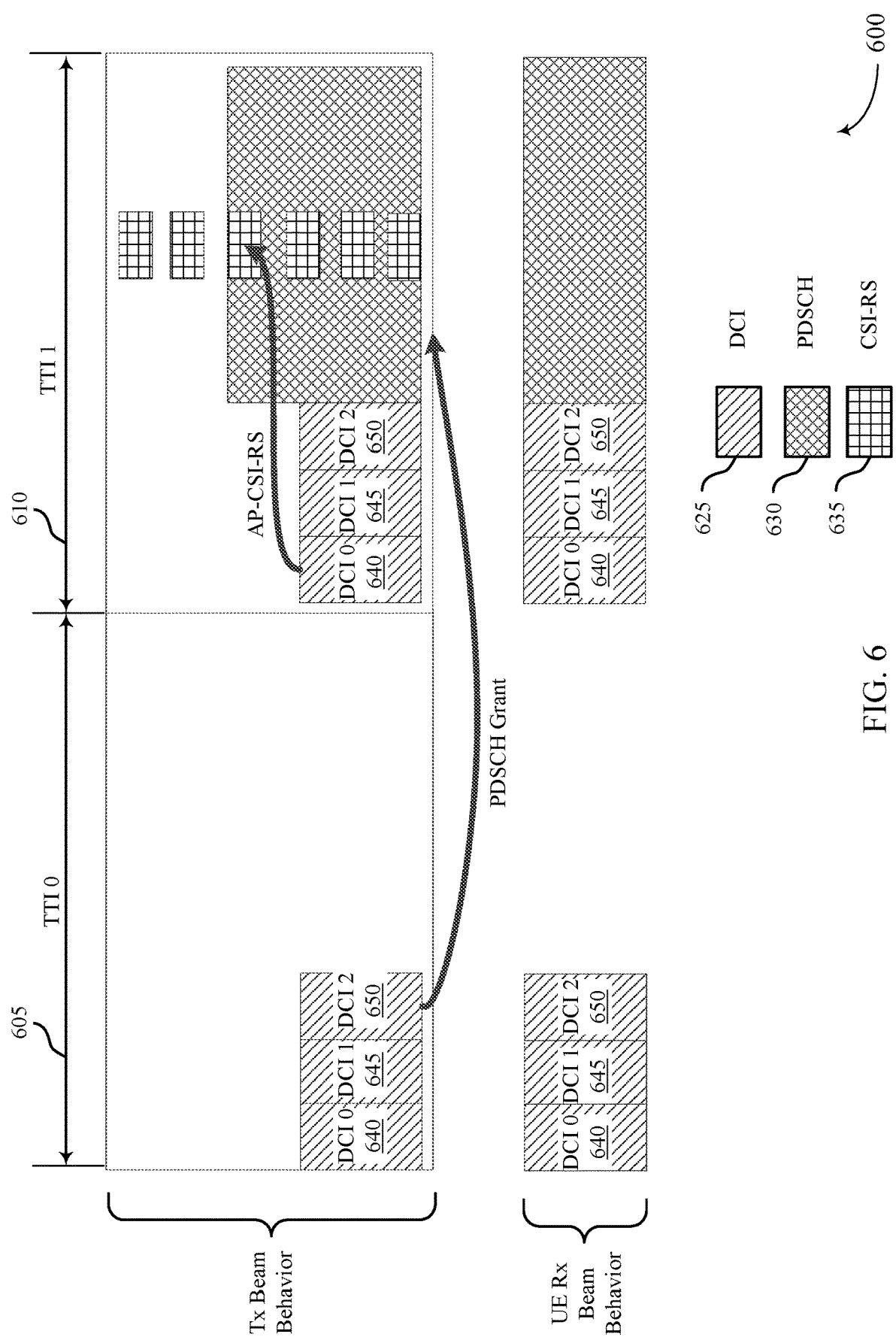
FIG. 6 illustrates an example of channel state information reference signal resources that support downlink transmission beam configuration techniques for wireless communications in accordance with aspects of the present disclosure.

FIG. 6 illustrates an example of reference signal configurations 600 that support downlink transmission beam configuration techniques for wireless communications in accordance with various aspects of the present disclosure. In some examples, reference signal configurations 600 may be implemented in aspects of wireless communication system 100 or 200. In the example of FIG. 6, DCI 625 may include a number of DCI transmissions 640, 645, 650, that may be transmitted by a base station 105. In some cases, DCI transmission 650 in a first TTI 605 (TTI-0 in the example of FIG. 6) may provide information to a UE 115 for a PDSCH 630 grant in a second TTI 610 (TTI-1 in the example of FIG. 6). Additionally, aperiodic CSI-RS transmissions 635 may be triggered by DCI transmission 640 in the second TTI 610.

In some cases, the set of rules defining a priority order may also define that, when an aperiodic CSI-RS grant QCL and PDSCH QCL mismatch, and AP CSI-RS and PDSCH are FDM'ed, the UE 115 may disregard the AP CSI-RS and is not expected to measure CSI-RS. Thus, in the example of FIG. 6, the UE 115 may ignore the aperiodic CSI-RS trigger, and monitor for the PDSCH 630 using beamforming parameters indicated by the DCI transmission 650. In some cases, the base station 105 may skip transmitting the aperiodic CSI-RS transmissions 635, and reuse the associated resources for downlink transmissions.

Figure 7A:
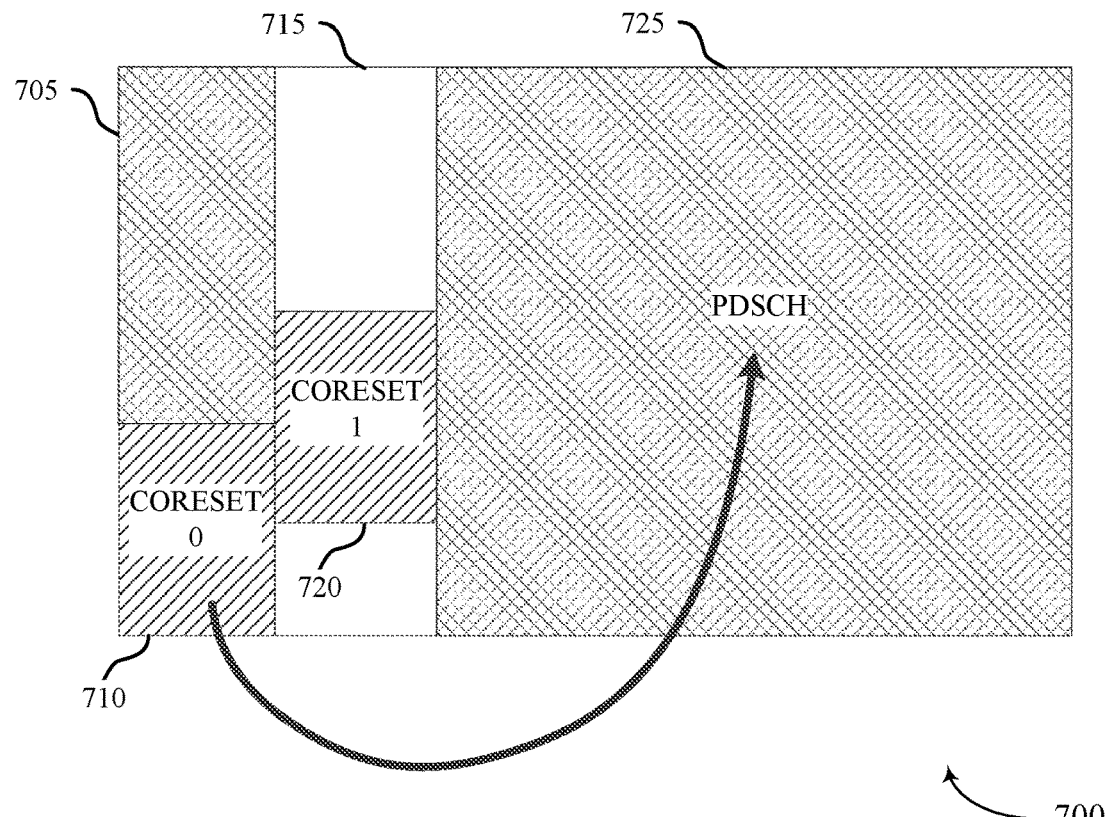
FIGS. 7A and 7B illustrate examples of search spaces and beamforming parameters that support downlink transmission beam configuration techniques for wireless communications in accordance with aspects of the present disclosure.
Figure 7B:
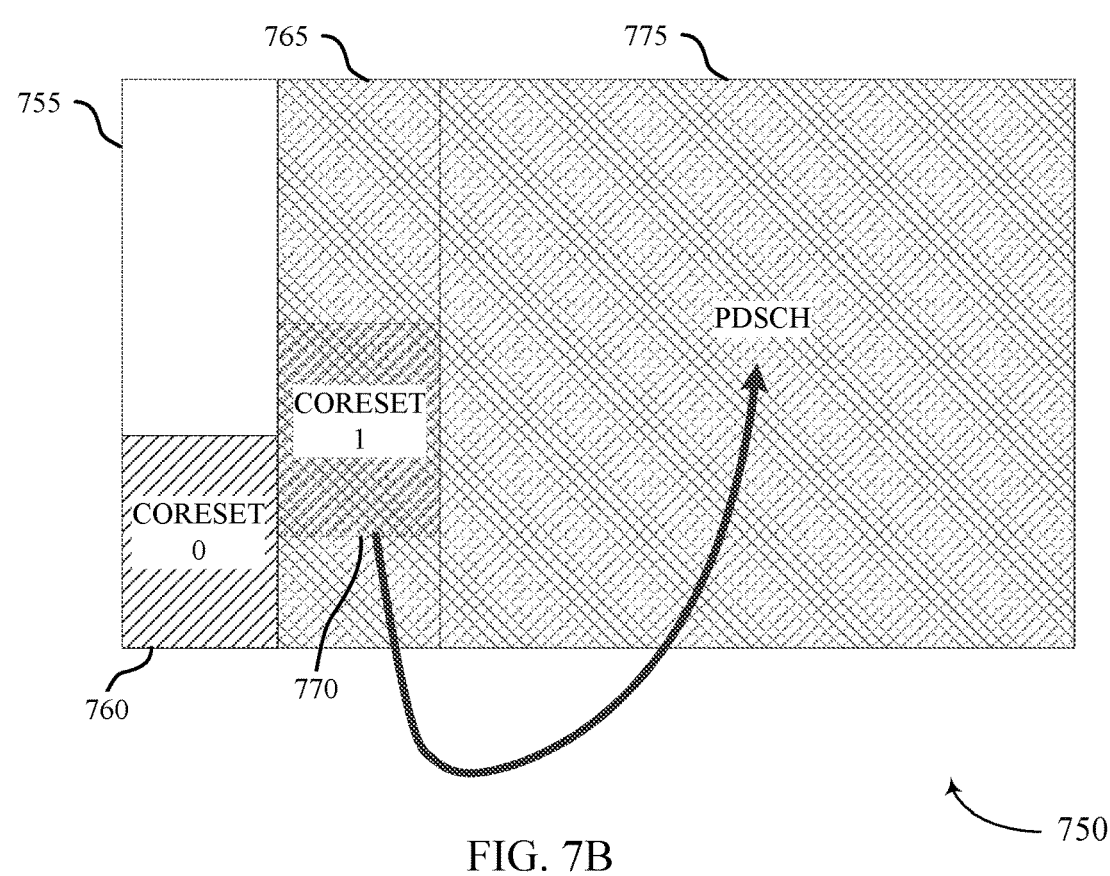

FIGS. 7A and 7B illustrate examples of search spaces and beamforming parameters 700, 750 that supports downlink transmission beam configuration techniques for wireless communications in accordance with various aspects of the present disclosure. In some examples, search spaces and beamforming parameters 700, 750 may be implemented in aspects of wireless communication system 100 or 200. In the example of FIG. 7A, a first CORESET 710 may be transmitted, using a first set of beamforming parameters, in a first symbol 705, and a second CORESET 720 may be transmitted, using a second set of beamforming parameters, in a second symbol 715.

In this example, the first CORESET 710 may include a grant for PDSCH 725, which may use the first set of beamforming parameters. Thus, in this case, a UE 115 may switch beamforming parameters while receiving a receive beam using the first set of beamforming parameters, to the second set of beamforming parameters, and then back to the first set of beamforming parameters in order to receive the PDSCH 725. In some circumstances, such a situation may result when the UE 115 monitors the lowest CORESET ID (CORESET 0) 710, by default, in the latest slot (i.e., for PDSCH reception). In one example, the first CORESET 710 may be associated with CORESET ID 0, and may be used for monitoring remaining system information (RMSI). Further, the UE 115 may be expected to monitor the RMSI beam (i.e., by default). In such cases, the UE 115 may also monitor the second CORESET 720, leading to frequent beam switching, as shown in FIG. 7A. Additionally, DMRS channel estimation may involve jumping one symbol (second symbol 715), which may lead to a performance loss while extrapolating the channel across the symbol. In some cases, such a performance loss may be mitigated if the DMRS channel estimation is based on a CORESET in the latest symbol.

In the example of FIG. 7B, such a situation may be avoided by configuring (or defining) the UE 115 to monitor a lowest CORESET ID among CORESETs associated with a search space overlapping with latest symbol. In such cases, the UE 115 may monitor the first CORESET 760 in first symbol 755, may monitor the second CORESET 770 in the second symbol 765, and may use the same beamforming parameters to continue monitoring PDSCH 775. Thus, in such cases, the UE 115 may avoid additional switching between different transmission beams.

Figure 8:
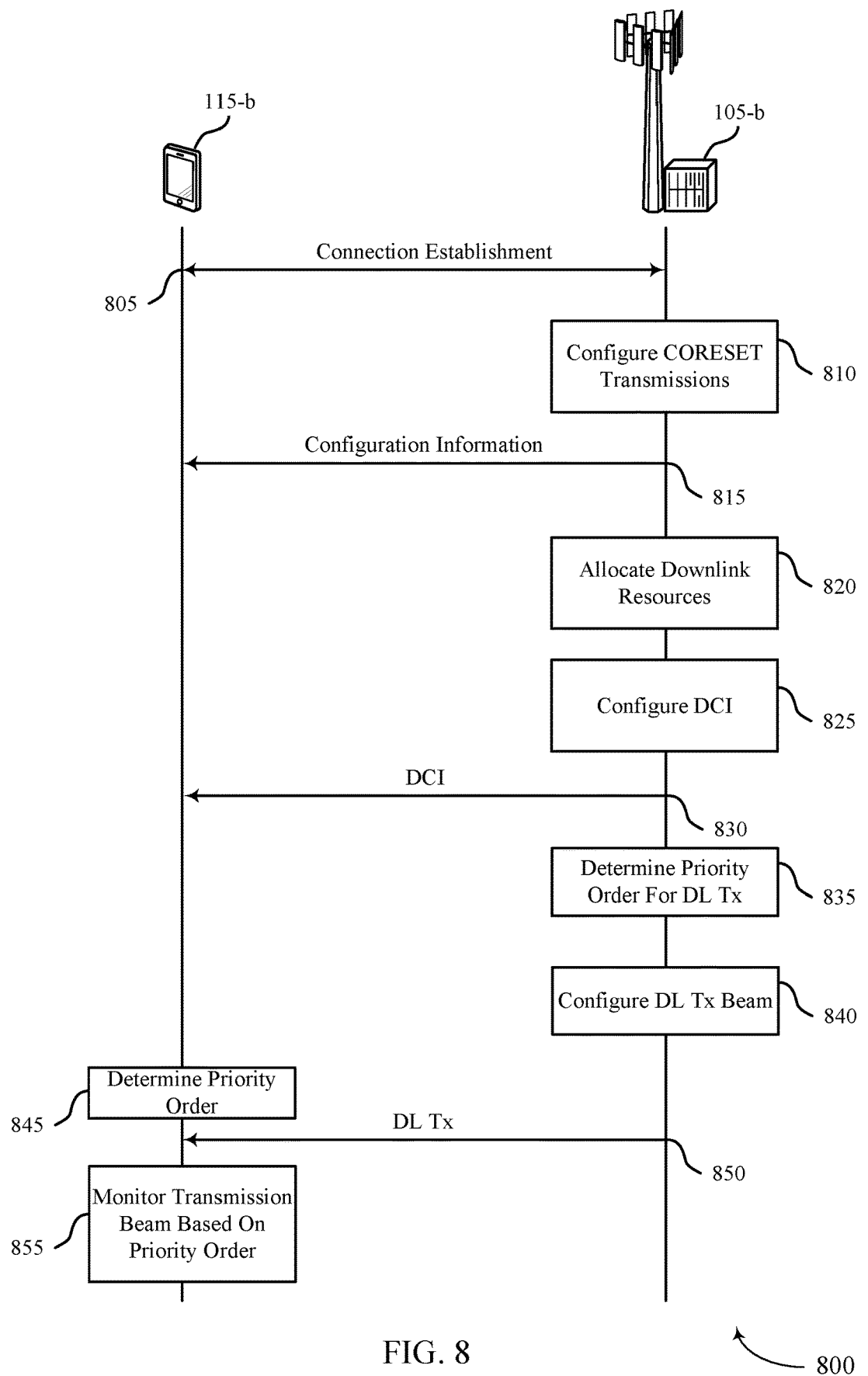
FIG. 8 illustrates an example of a process flow that supports downlink transmission beam configuration techniques for wireless communications in accordance with aspects of the present disclosure.

FIG. 8 illustrates an example of a process flow 800 that supports downlink transmission beam configuration techniques for wireless communications in accordance with various aspects of the present disclosure. In some examples, process flow 800 may be implemented in aspects of wireless communication system 100 or 200. Process flow 800 may include base station 105-*b*, and UE 115-*b*, which may be examples of the corresponding devices described with reference to FIG. 1-2.

At 805, UE 115-*b* and base station 105-*b* may establish a connection with each other. In some cases, such a connection establishment may be performed according to established connection establishment techniques. In some cases, a beam sweep procedure may be conducted, in which base station 105-*b* transmits a number of transmission beams in a number of different directions, and UE 115-*b* monitors the transmission beams and identifies a transmission beam for use in transmissions from base station 105-*b* to UE 115-*b*. In some cases, one or more beam refinement procedures may also be performed.

At 810, base station 105-*b* may configure CORESET transmissions. As indicated above, in some cases, a base station 105-*b* may configure periodic CORESET transmissions that may be used to provide DCI to UE 115-*b*, as well as other UEs 115. In some examples, the CORESET transmissions may be configured with certain beamforming parameters, that may be used to monitor the CORESET transmissions at UE 115-*b*.

At 820, base station 105-*b* may allocate downlink resources (e.g., for a PDSCH transmission) to UE 115-*b*. In some cases, the downlink resources may be configured with a first set of beamforming parameters, and be located within a first TTI.

At 825, base station 105-*b* may configure a DCI for transmission to UE 115-*b*. The DCI may include an allocation for indicating the downlink resources allocated at 820. Further, base station 105-*b* may transmit the DCI 830 to UE 115-*b*, which may receive the DCI and determine the downlink resources and associated beamforming parameters.

At 835, base station 105-*b* may determine a priority order for the downlink transmission. As indicated above, in some cases, the priority order may be determined based on a set of rules that define the priority order. In some cases, the priority order may identify whether a CORESET or PDSCH is to be transmitted to UE 115-*b* within a same TTI. In some examples, the priority order may be based on a priority of a communication associated with the PDSCH and the CORESET. In some cases, the PDSCH transmission may be given a higher priority unless the CORESET is associated with a higher priority communication.

At 840, base station 105-*b* may configure a downlink transmission beam. The downlink transmission beam may be configured using beamforming parameters that were determined based on the priority order for the downlink transmission. Further, the information transmitted in the downlink transmission beam may be determined based on the priority order. For example, if the PDSCH transmission has higher priority than a CORESET transmission, the downlink transmission beam may be configured to transmit the PDSCH transmission, and may not transmit the CORESET. In some cases, CORESET resources may be reused for downlink PDSCH transmissions. Base station 105-*b* may then transmit the downlink transmission 850.

At 845, UE 115-*b* may determine the priority order, which may be performed according to the same priority order determination made at base station 105-*b* at 835. In some cases, at 850, base station 105-*b* may transmit the downlink transmission(s) to UE 115-*b*.

At 855, UE 115-*b* may monitor the transmission beam based on the priority order. As discussed above, in some cases, the beamforming parameters used for monitoring the transmission beam at UE 115-*b*, as well as the information monitored may be determined according to various described priority order techniques.

Figure 9:
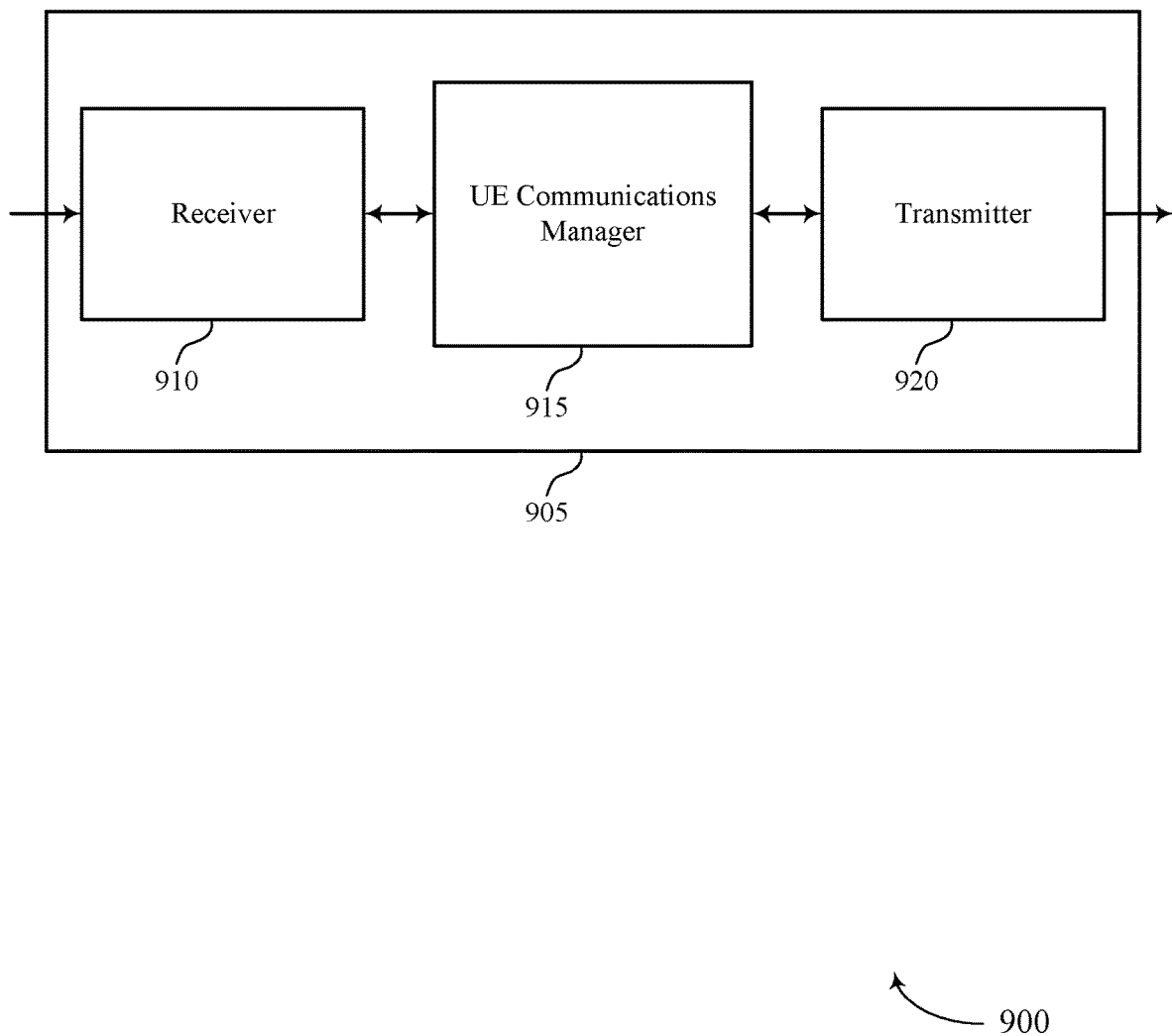
FIGS. 9 through 11 show block diagrams of a device that supports downlink transmission beam configuration techniques for wireless communications in accordance with aspects of the present disclosure.

FIG. 9 shows a block diagram 900 of a wireless device 905 that supports downlink transmission beam configuration techniques for wireless communications in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to downlink transmission beam configuration techniques for wireless communications, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof, in accordance with various aspects of the present disclosure.

UE communications manager 915 may receive a downlink grant from a base station 105, the downlink grant indicating a first set of beamforming parameters to be used by the UE for receiving a downlink transmission via a downlink transmission beam from the base station 105 during a first TTI, determine that a control resource set is to be monitored during at least a portion of the first TTI using a second set of beamforming parameters, identify a set of rules defining a priority order associated with the downlink transmission and the control resource set, and receive, based on the priority order, at least one of the downlink transmission using the first set of beamforming parameters or the control resource set using the second set of beamforming parameters.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
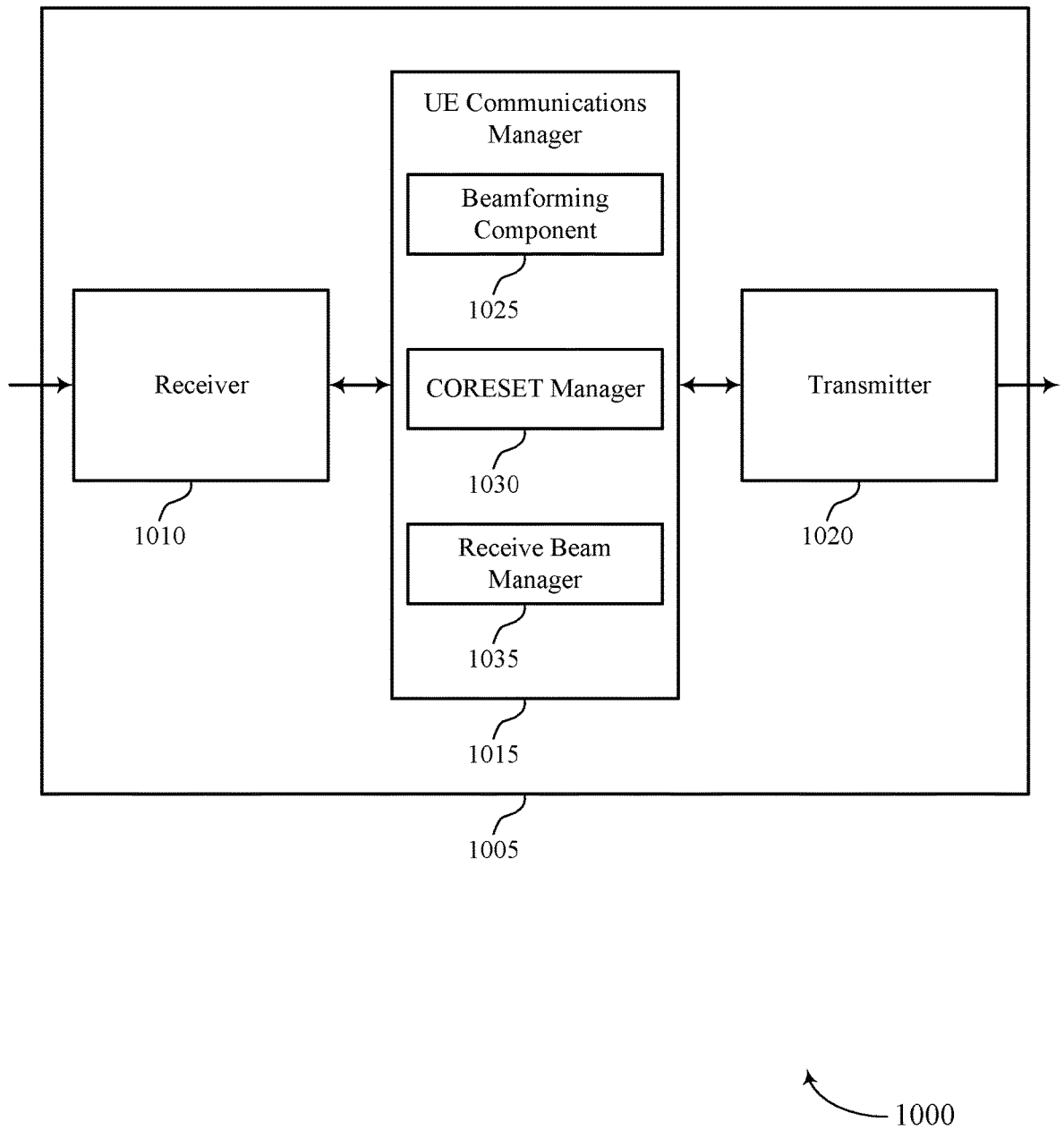

FIG. 10 shows a block diagram 1000 of a wireless device 1005 that supports downlink transmission beam configuration techniques for wireless communications in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to downlink transmission beam configuration techniques for wireless communications, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include beamforming component 1025, CORESET manager 1030, and receive beam manager 1035.

Beamforming component 1025 may receive a downlink grant from a base station 105, the downlink grant indicating a first set of beamforming parameters to be used by the UE 115 for receiving a downlink transmission via a downlink transmission beam from the base station 105 during a first TTI. In some cases, beamforming component 1025 may receive one or more other sets of downlink beamforming parameters, such as a second set of downlink beamforming parameters associated with one or more CORESETs, or a third set of beamforming parameters for monitoring a transmission beam that includes a control resource set for RMSI.

CORESET manager 1030 may determine that a control resource set is to be monitored during at least a portion of the first TTI using a second set of beamforming parameters. In some cases, CORESET manager 1030 may identify two or more different control resource sets configured by the base station 105, where each of the two or more different control resource sets having a different priority in the priority order. In some cases, a first control resource set of the two or more different control resource sets corresponds to transmissions of an URLLC service, and may have a higher priority than the downlink transmission. Further, a second control resource set of the two or more different control resource sets may correspond to transmissions of an eMBB service having a lower priority than the downlink transmission.

Receive beam manager 1035 may identify a set of rules defining a priority order associated with the downlink transmission and the control resource set, and receive, based on the priority order, at least one of the downlink transmission using the first set of beamforming parameters, or the control resource set using the second set of beamforming parameters. In some cases, receive beam manager 1035 may receive the downlink transmission using the first set of beamforming parameters, and receive the downlink transmission during the first TTI using the subset of resources that are configured for transmitting the control resource set. In some cases, the set of rules define which of the first set of downlink beamforming parameters or the second set of downlink beamforming parameters are to be used for spatial receive beam filtering. In some cases, the set of rules define whether the downlink transmission is rate-matched around the control resource set. In some cases, the receiving at least one of the downlink transmission, or the control resource set includes identifying a subset of resources within the first TTI that are configured for transmitting the control resource set. In some cases, the set of rules defines that the priority order is based on one or more of a type of transmission associated with the control resource set, a RNTI that is monitored by the UE, frequency division multiplexing between downlink resources for the downlink transmission and downlink resources of the control resource set, a capability of the UE 115 to concurrently receive multiple transmission beams, or any combination thereof. In some cases, receive beam manager 1035 may determine, based on the first set of downlink beamforming parameters and a second set of beamforming parameters, a priority order associated with the downlink transmission and a control resource set of the first TTI.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
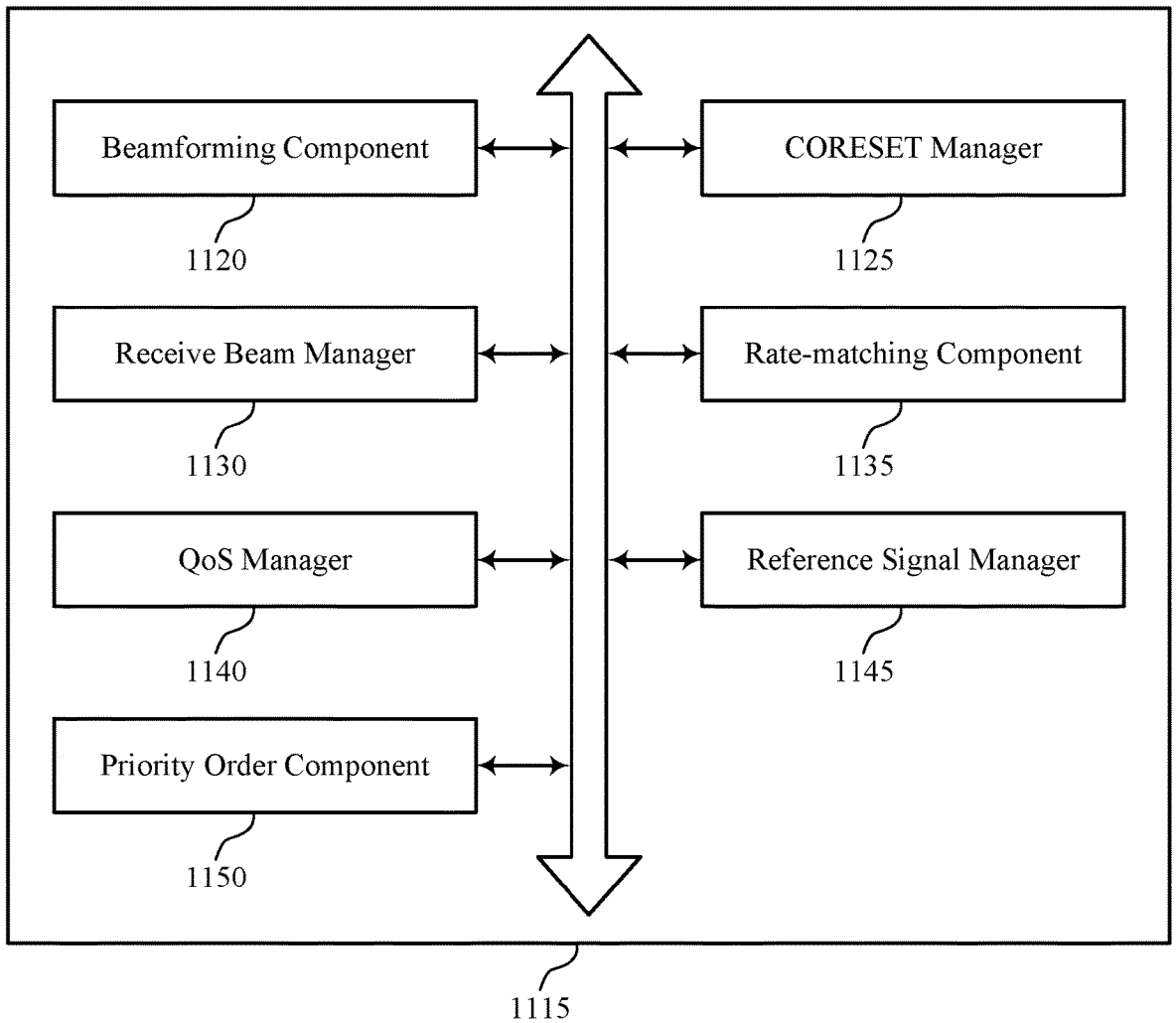

FIG. 11 shows a block diagram 1100 of a UE communications manager 1115 that supports downlink transmission beam configuration techniques for wireless communications in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include beamforming component 1120, CORESET manager 1125, receive beam manager 1130, rate-matching component 1135, QoS manager 1140, reference signal manager 1145, and priority order component 1150. Each of these modules may communicate, directly or indirectly, with one another (e.g., via one or more buses).

Beamforming component 1120 may receive a downlink grant from a base station 105, the downlink grant indicating a first set of downlink beamforming parameters to be used by the UE 115 for receiving a downlink transmission via a downlink transmission beam from the base station 105 during a first TTI. In some cases, beamforming component 1120 may receive one or more other sets of downlink beamforming parameters, such as a second set of downlink beamforming parameters associated with one or more CORESETs, or a third set of beamforming parameters for monitoring a transmission beam that includes a control resource set for RMSI.

CORESET manager 1125 may determine that a control resource set is to be monitored during at least a portion of the first TTI using a second set of beamforming parameters. In some cases, CORESET manager 1030 may identify two or more different control resource sets configured by the base station 105, each of the different control resource sets having a different priority in the priority order. In some cases, a first control resource set of the two or more different control resource sets corresponds to transmissions of an URLLC service and has a higher priority than the downlink transmission, and a second control resource set of the two or more different control resource sets corresponds to transmissions of an eMBB service, and has a lower priority than the downlink transmission.

Receive beam manager 1130 may identify a set of rules defining a priority order associated with the downlink transmission and the control resource set, and receive, based on the priority order, at least one of the downlink transmission using the first set of beamforming parameters or the control resource set using the second set of beamforming parameters. In some cases, receive beam manager 1130 may receive the downlink transmission using the first set of beamforming parameters, and receive the downlink transmission during the first TTI using the subset of resources that are configured for transmitting the control resource set. In some cases, the set of rules define which of the first set of downlink beamforming parameters or the second set of downlink beamforming parameters are to be used for spatial receive beam filtering. In some cases, the set of rules define whether the downlink transmission is rate-matched around the control resource set. In some cases, receive beam manager 1130 may determine, based on the first set of downlink beamforming parameters and a second set of beamforming parameters, a priority order associated with the downlink transmission and a control resource set of the first TTI.

In some cases, receiving at least one of the downlink transmission or the control resource set includes identifying a subset of resources within the first TTI that are configured for transmitting the control resource set. In some cases, the set of rules defines that the priority order is based on one or more of a type of transmission associated with the control resource set, a radio network temporary identifier (RNTI) that is monitored by the UE, frequency division multiplexing between downlink resources for the downlink transmission and downlink resources of the control resource set, a capability of the UE 115 to concurrently receive multiple transmission beams, or any combination thereof. In some cases, the priority order may be determined based on a RNTI that is monitored by the UE. In some cases, the priority order may be determined on at least one of one or more downlink resources for the downlink transmission and at least one of one or more downlink resources of the control resource set residing within a same OFDM symbol. In some cases, the priority order may indicate that the control resource set has a higher priority than the downlink transmission. In some cases, receiving at least one of the downlink transmission or the control resource set may include ignoring the downlink grant and receiving the control resource set based on the priority order.

Rate-matching component 1135 may monitor the control resource set using the first set of beamforming parameters when the downlink transmission is determined to be rate-matched around the control resource set.

QoS manager 1140 may identify and manage QoS aspects of transmissions. In some cases, the priority order indicates that a QoS associated with the control resource set has a higher priority than the downlink transmission, and the receiving at least one of the downlink transmission or the control resource set includes ignoring the downlink grant and receiving the control resource set. In some cases, the QoS associated with the control resource set is an URLLC QoS, and a QoS associated with the downlink transmission has a lower priority than the URLLC QoS.

Reference signal manager 1145 may identify an aperiodic CSI-RS configuration within the first TTI with a third set of beamforming parameters, disregard the aperiodic CSI configuration, receive the downlink transmission using the first set of beamforming parameters during the first TTI. In some cases, reference signal manager 1145 may monitor for the downlink transmission using the third set of beamforming parameters when a search space for the RMSI control resource set overlaps with the first TTI.

Priority order component 1150 may, in some cases, identify the priority order based on the set of rules, which may be statically defined at the UE or received semi-statically via radio resource control signaling.

Figure 12:
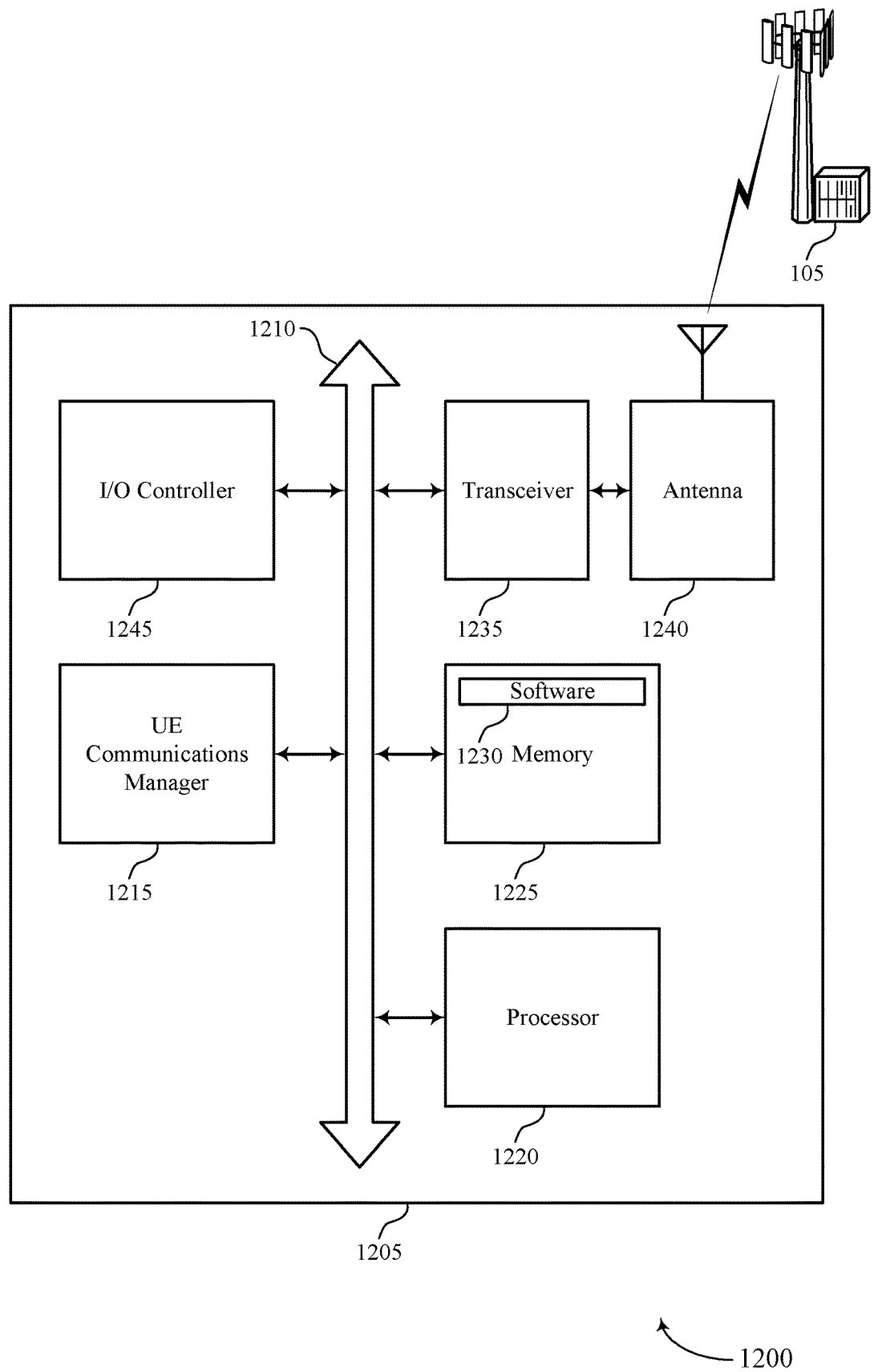
FIG. 12 illustrates a block diagram of a system including a UE that supports downlink transmission beam configuration techniques for wireless communications in accordance with aspects of the present disclosure.

FIG. 12 shows a diagram of a system 1200 including a device 1205 that supports downlink transmission beam configuration techniques for wireless communications in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). In some examples, the UE communications manager 1015 may be implemented with any combination of processor 1220, memory 1225, software 1230, and transceiver 1235, as well as with any other of the described components, to perform the various techniques described herein. Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting downlink transmission beam configuration techniques for wireless communications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support downlink transmission beam configuration techniques for wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases, the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
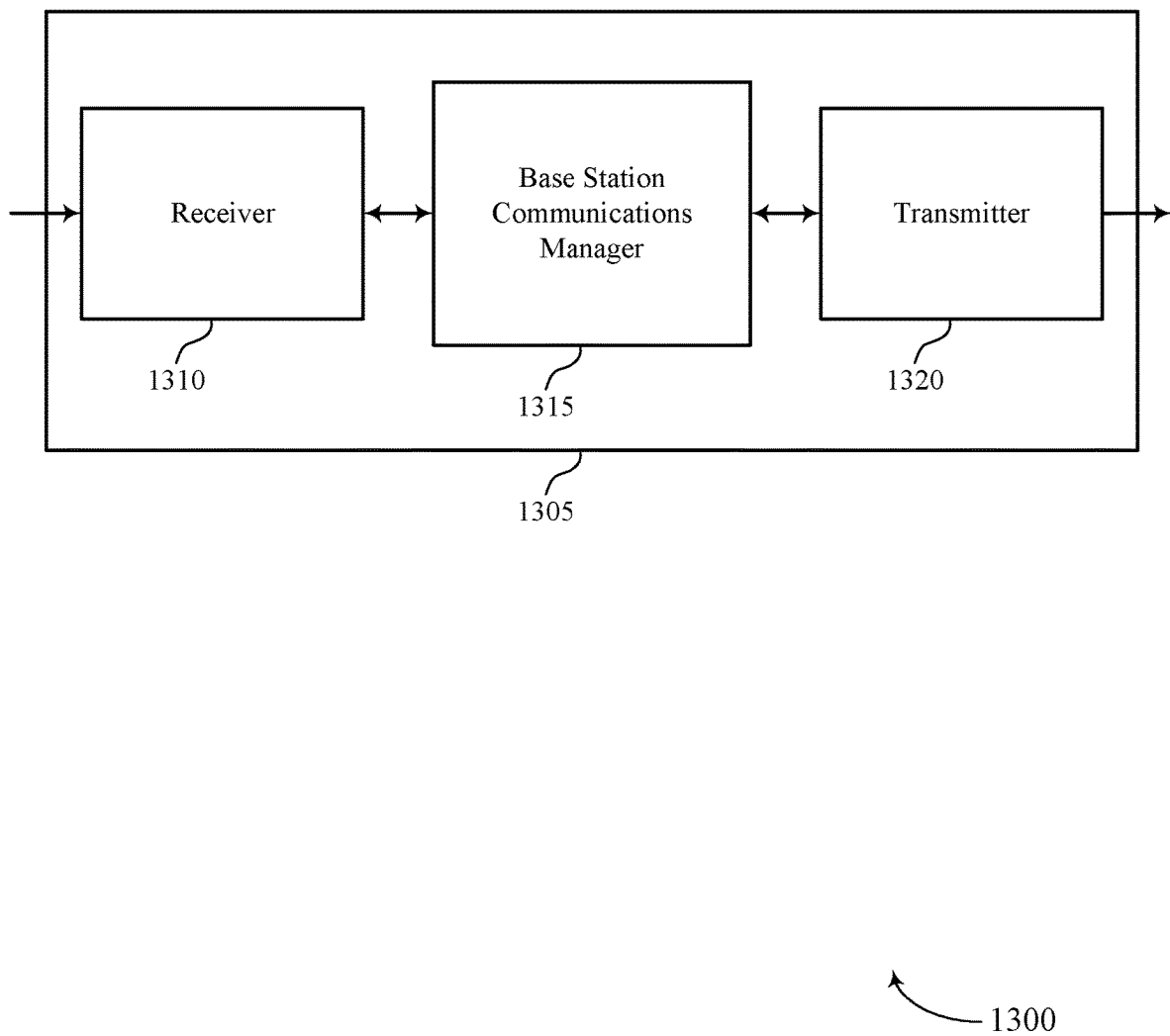
FIGS. 13 through 15 show block diagrams of a device that supports downlink transmission beam configuration techniques for wireless communications in accordance with aspects of the present disclosure.

FIG. 13 shows a block diagram 1300 of a wireless device 1305 that supports downlink transmission beam configuration techniques for wireless communications in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to downlink transmission beam configuration techniques for wireless communications, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

In some cases, the base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may transmit a downlink grant to a UE, the downlink grant indicating a first set of beamforming parameters to be used by the UE 115 for receiving a downlink transmission via a downlink transmission beam during a first TTI, determine that a control resource set is to be transmitted during at least a portion of the first TTI using a second set of beamforming parameters, identify a set of rules defining a priority order associated with the downlink transmission and the control resource set, and transmit, based on the priority order, at least one of the downlink transmission using the first set of beamforming parameters or the control resource set using the second set of beamforming parameters.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
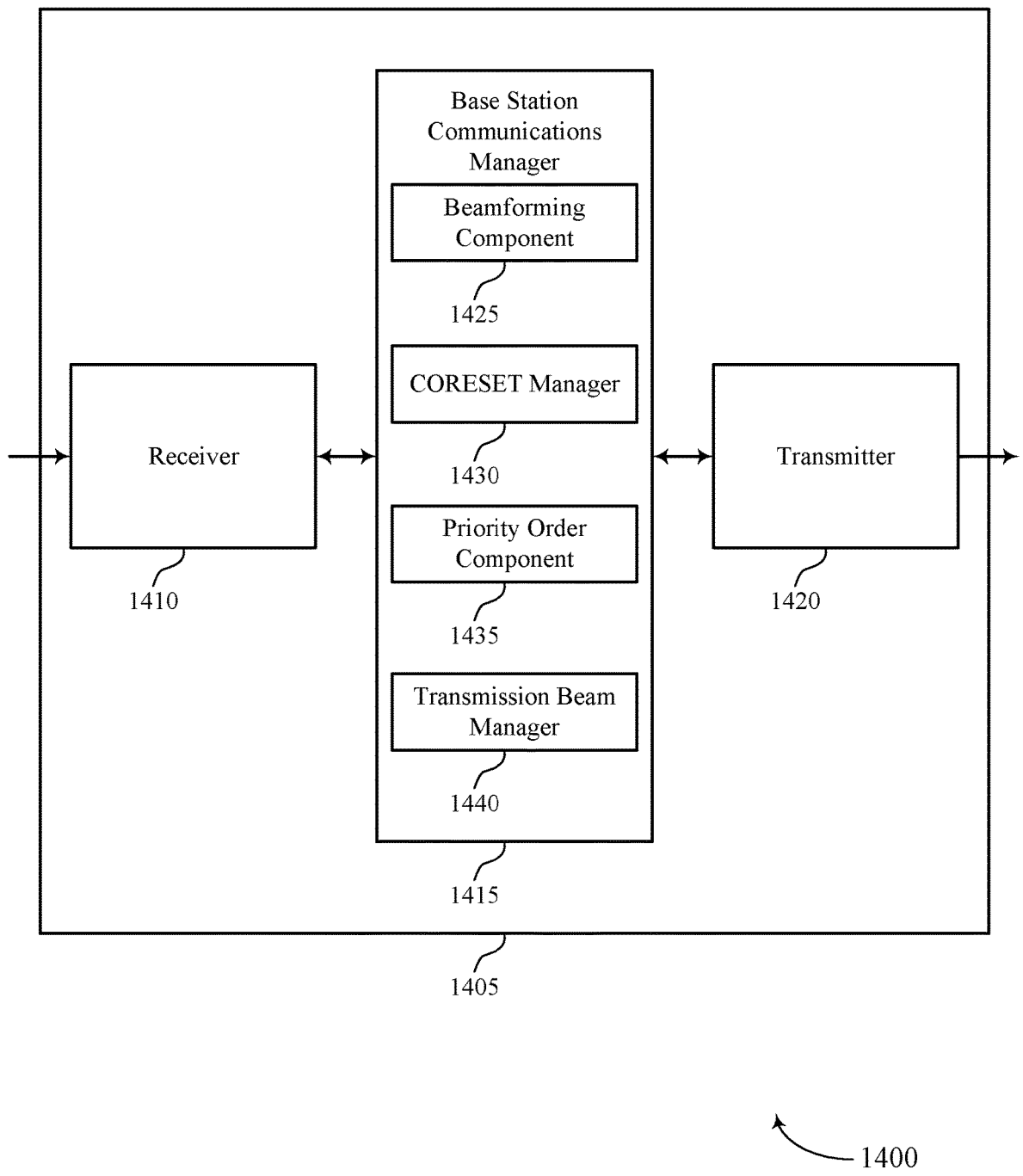

FIG. 14 shows a block diagram 1400 of a wireless device 1405 that supports downlink transmission beam configuration techniques for wireless communications in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to downlink transmission beam configuration techniques for wireless communications, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16.

Base station communications manager 1415 may also include beamforming component 1425, CORESET manager 1430, priority order component 1435, and transmission beam manager 1440.

Beamforming component 1425 may transmit a downlink grant to a UE, the downlink grant indicating a first set of beamforming parameters to be used by the UE 115 for receiving a downlink transmission via a downlink transmission beam during a first TTI. In some cases, beamforming component 1425 may identify a third set of beamforming parameters for a transmission beam that includes a RMSI control resource set.

CORESET manager 1430 may determine that a control resource set is to be transmitted during at least a portion of the first TTI using a second set of beamforming parameters. In some cases, CORESET manager 1430 may skip transmission of the control resource set based on the priority order. In some cases, CORESET manager 1430 may identify two or more different control resource sets having a different priority in the priority order. In some cases, a first control resource set of the two or more different control resource sets corresponds to transmissions of an URLLC service and has a higher priority than the downlink transmission, and a second control resource set of the two or more different control resource sets corresponds to transmissions of an eMBB service and has a lower priority than the downlink transmission.

Priority order component 1435 may identify a set of rules defining a priority order associated with the downlink transmission and the control resource set. In some cases, the set of rules defining the priority order indicate which of the first set of downlink beamforming parameters, or the second set of downlink beamforming parameters are to be used for spatial receive beam filtering. In some cases, the set of rules defining the priority order indicate whether the downlink transmission is rate-matched around the control resource set. In some cases, the set of rules defines that the priority order is based on one or more of a type of transmission associated with the control resource set, a RNTI that is to be monitored by the UE, frequency division multiplexing between downlink resources for the downlink transmission and resources of the control resource set, a capability of the UE 115 to concurrently receive multiple transmission beams, or any combination thereof. In some cases, the set of rules are statically defined or are received semi-statically via radio resource control signaling. In some cases, priority order component 1435 may determine, based on the first set of downlink beamforming parameters and a second set of beamforming parameters, a priority order associated with the downlink transmission and a control resource set of the first TTI.

Transmission beam manager 1440 may transmit the downlink transmission using resources within the first TTI that are configured for transmitting the control resource set, transmit the downlink transmission using the third set of beamforming parameters when a search space for the RMSI control resource set overlaps with the first TTI, and transmit, based on the priority order, at least one of the downlink transmission using the first set of beamforming parameters, or the control resource set using the second set of beamforming parameters.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
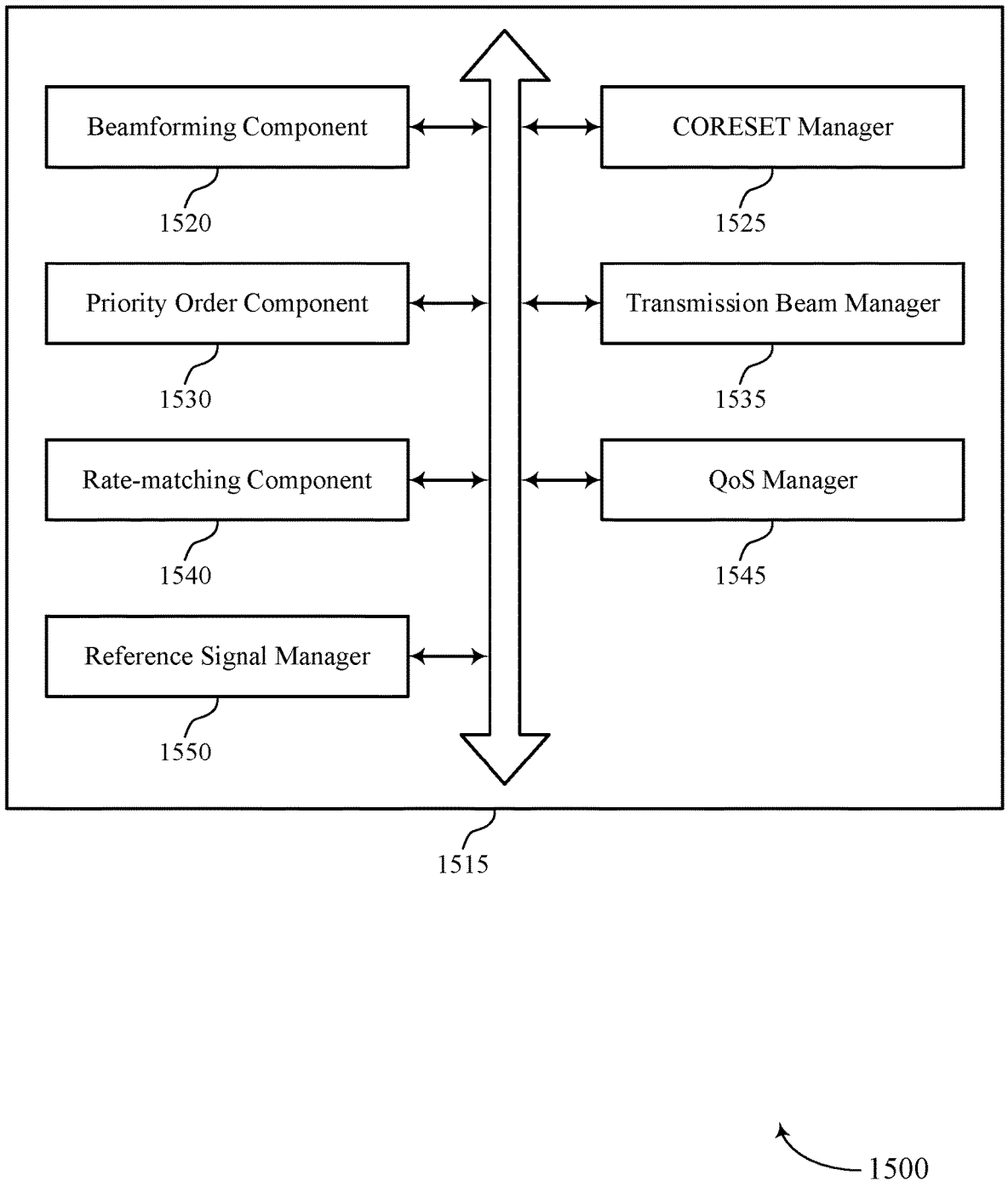

FIG. 15 shows a block diagram 1500 of a base station communications manager 1515 that supports downlink transmission beam configuration techniques for wireless communications in accordance with aspects of the present disclosure. The base station communications manager 1515 may be an example of aspects of a base station communications manager 1615 described with reference to FIGS. 13, 14, and 16. The base station communications manager 1515 may include beamforming component 1520, CORESET manager 1525, priority order component 1530, transmission beam manager 1535, rate-matching component 1540, QoS manager 1545, and reference signal manager 1550. Each of these modules may communicate, directly or indirectly, with one another (e.g., via one or more buses).

Beamforming component 1520 may transmit a downlink grant to a UE, the downlink grant indicating a first set of beamforming parameters to be used by the UE 115 for receiving a downlink transmission via a downlink transmission beam during a first TTI. In some cases, beamforming component 1520 may identify a third set of beamforming parameters for a transmission beam that includes a RMSI control resource set.

CORESET manager 1525 may determine that a control resource set is to be transmitted during at least a portion of the first TTI using a second set of beamforming parameters. In some cases, CORESET manager 1525 may skip transmission of the control resource set based on the priority order. In some cases, CORESET manager 1525 may identify two or more different control resource sets having a different priority in the priority order. In some cases, a first control resource set of the two or more different control resource sets corresponds to transmissions of an URLLC service having a higher priority than the downlink transmission, and a second control resource set of the two or more different control resource sets corresponds to transmissions of an eMBB service having a lower priority than the downlink transmission.

Priority order component 1530 may identify a set of rules defining a priority order associated with the downlink transmission and the control resource set. In some cases, the set of rules defining the priority order indicate which of the first set of downlink beamforming parameters, or the second set of downlink beamforming parameters are to be used for spatial receive beam filtering. In some cases, the set of rules defining the priority order indicate whether the downlink transmission is to be rate-matched around the control resource set. In some cases, the set of rules defines that the priority order is based on one or more of a type of transmission associated with the control resource set, a RNTI that is to be monitored by the UE, frequency division multiplexing between downlink resources for the downlink transmission and resources of the control resource set, a capability of the UE 115 to concurrently receive multiple transmission beams, or any combination thereof.

In some cases, the set of rules are statically defined. In other cases, the set of rules may be received semi-statically via radio resource control signaling. In some cases, priority order component 1530 may determine, based on the first set of downlink beamforming parameters and a second set of beamforming parameters, a priority order associated with the downlink transmission and a control resource set of the first TTI. In some cases, the priority order may be determined based on a RNTI that is to be monitored by the UE. In some cases, the priority order may be determined based on at least one of one or more downlink resources for the downlink transmission and at least one of one or more downlink resources of the control resource set residing within a same OFDM symbol. In some cases, the priority order may indicate that the control resource set has a higher priority than the downlink transmission.

Transmission beam manager 1535 may transmit the downlink transmission using resources within the first TTI that are configured for transmitting the control resource set, transmit the downlink transmission using the third set of beamforming parameters when a search space for the RMSI control resource set overlaps with the first TTI, and transmit, based on the priority order, at least one of the downlink transmission using the first set of beamforming parameters or the control resource set using the second set of beamforming parameters. In some cases, transmitting at least one of the downlink transmission or the control resource set may include skipping transmission of the downlink grant and/or transmitting the control resource set based on the priority order.

Rate-matching component 1540 may transmit the control resource set using the first set of beamforming parameters when the downlink transmission is rate-matched around the control resource set.

QoS manager 1545 may, in some cases, identify the set of rules defining the priority order and identify that a QoS associated with the control resource set has a higher priority than the downlink transmission. In some cases, the transmitting device may skip transmitting the downlink transmission, and may only transmit the control resource set. In some cases, the QoS associated with the control resource set is an URLLC QoS, and a QoS associated with the downlink transmission has a lower priority than the URLLC QoS.

Reference signal manager 1550 may identify an aperiodic CSI-RS configuration within the first TTI with a third set of beamforming parameters, disregard the aperiodic CSI configuration, and transmit the downlink transmission using the first set of beamforming parameters during the first TTI.

Figure 16:
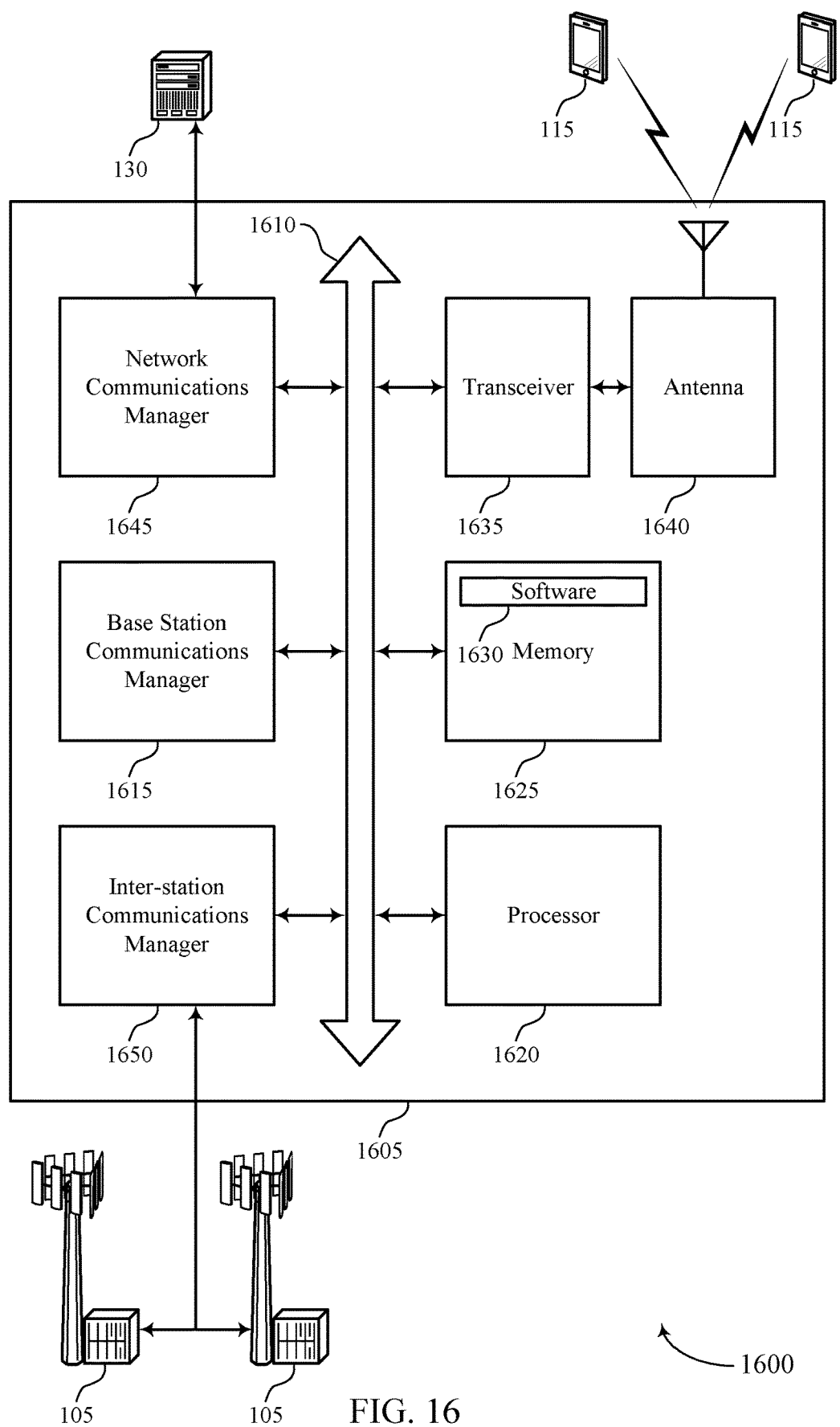
FIG. 16 illustrates a block diagram of a system including a base station that supports downlink transmission beam configuration techniques for wireless communications in accordance with aspects of the present disclosure.

FIG. 16 shows a diagram of a system 1600 including a device 1605 that supports downlink transmission beam configuration techniques for wireless communications in accordance with aspects of the present disclosure. Device 1605 may be an example of or include the components of base station 105 as described above, e.g., with reference to FIGS. 1 and 2. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). In some examples, the base station communications manager 1615 may be implemented with any combination of processor 1620, memory 1625, software 1630, and transceiver 1635, as well as with any other of the described components, to perform the various techniques described herein. In some examples, the inter-station communications manager 1650 may be implemented with any combination of processor 1620, memory 1625, software 1630, and transceiver 1635, as well as with any other of the described components, to perform the various techniques described herein. Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting downlink transmission beam configuration techniques for wireless communications).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support downlink transmission beam configuration techniques for wireless communications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases, the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within a wireless communication network deploying Long Term Evolution (LTE)/LTE-A technology, in order to provide communication between base stations 105.

Figure 17:
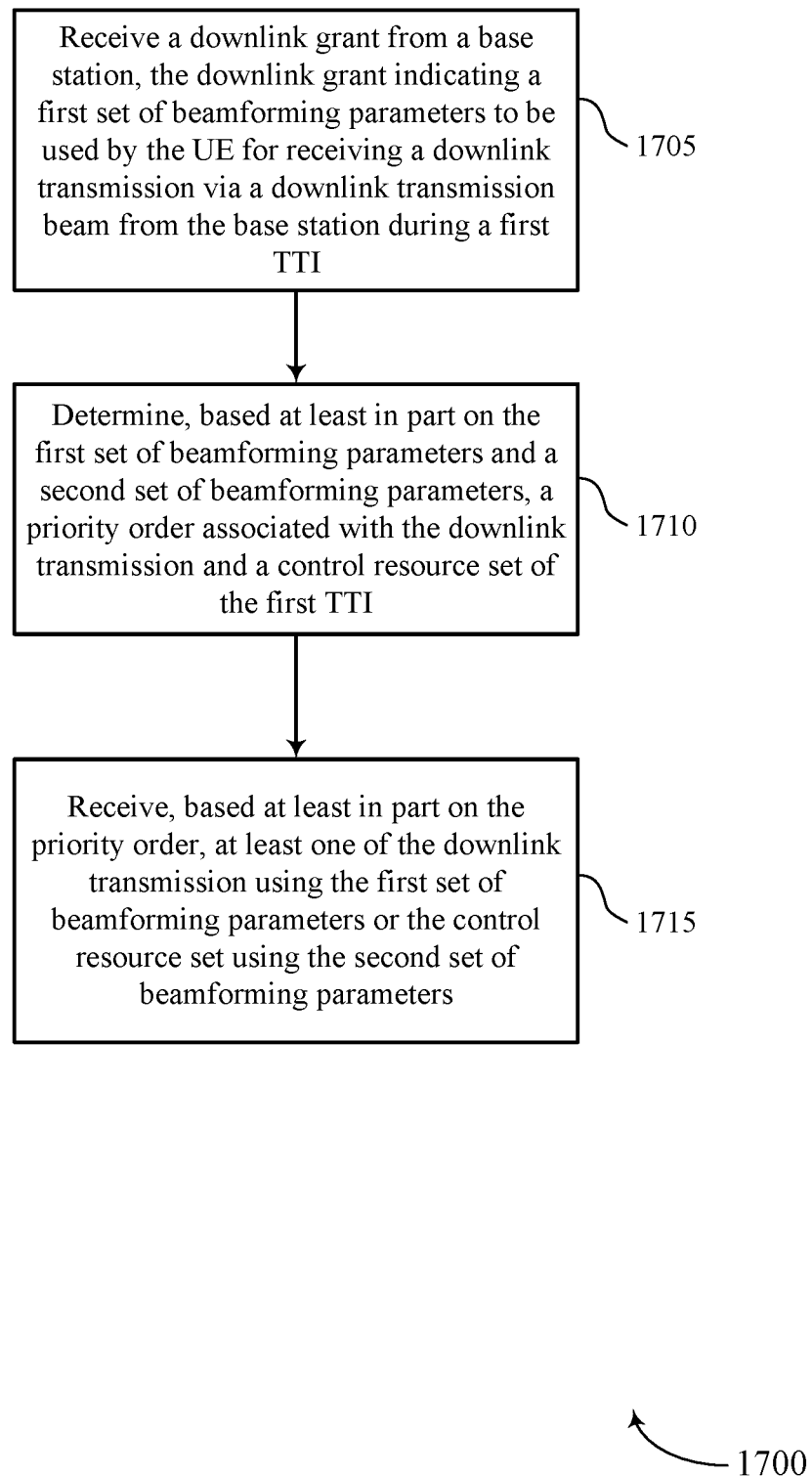
FIGS. 17 through 26 illustrate methods for downlink transmission beam configuration techniques for wireless communications in accordance with aspects of the present disclosure.

FIG. 17 shows a flowchart illustrating a method 1700 for downlink transmission beam configuration techniques for wireless communications in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may receive a downlink grant from a base station 105, the downlink grant indicating a first set of beamforming parameters to be used by the UE for receiving a downlink transmission via a downlink transmission beam from the base station 105 during a first TTI. The operations of 1705 may be performed according to the methods described herein. In certain examples, aspects of the operations of 1705 may be performed by a beamforming component as described with reference to FIGS. 9 through 12.

At 1710 the UE 115 may determine determining, based at least in part on the first set of beamforming parameters and a second set of beamforming parameters, a priority order associated with the downlink transmission and a control resource set of the first TTI. The operations of 1710 may be performed according to the methods described herein. In certain examples, aspects of the operations of 1710 may be performed by a CORESET manager as described with reference to FIGS. 9 through 12.

At 1715 the UE 115 may receive, based at least in part on the priority order, at least one of the downlink transmission using the first set of beamforming parameters or the control resource set using the second set of beamforming parameters. The operations of 1715 may be performed according to the methods described herein. In certain examples, aspects of the operations of 1715 may be performed by a receive beam manager as described with reference to FIGS. 9 through 12.

Figure 18:
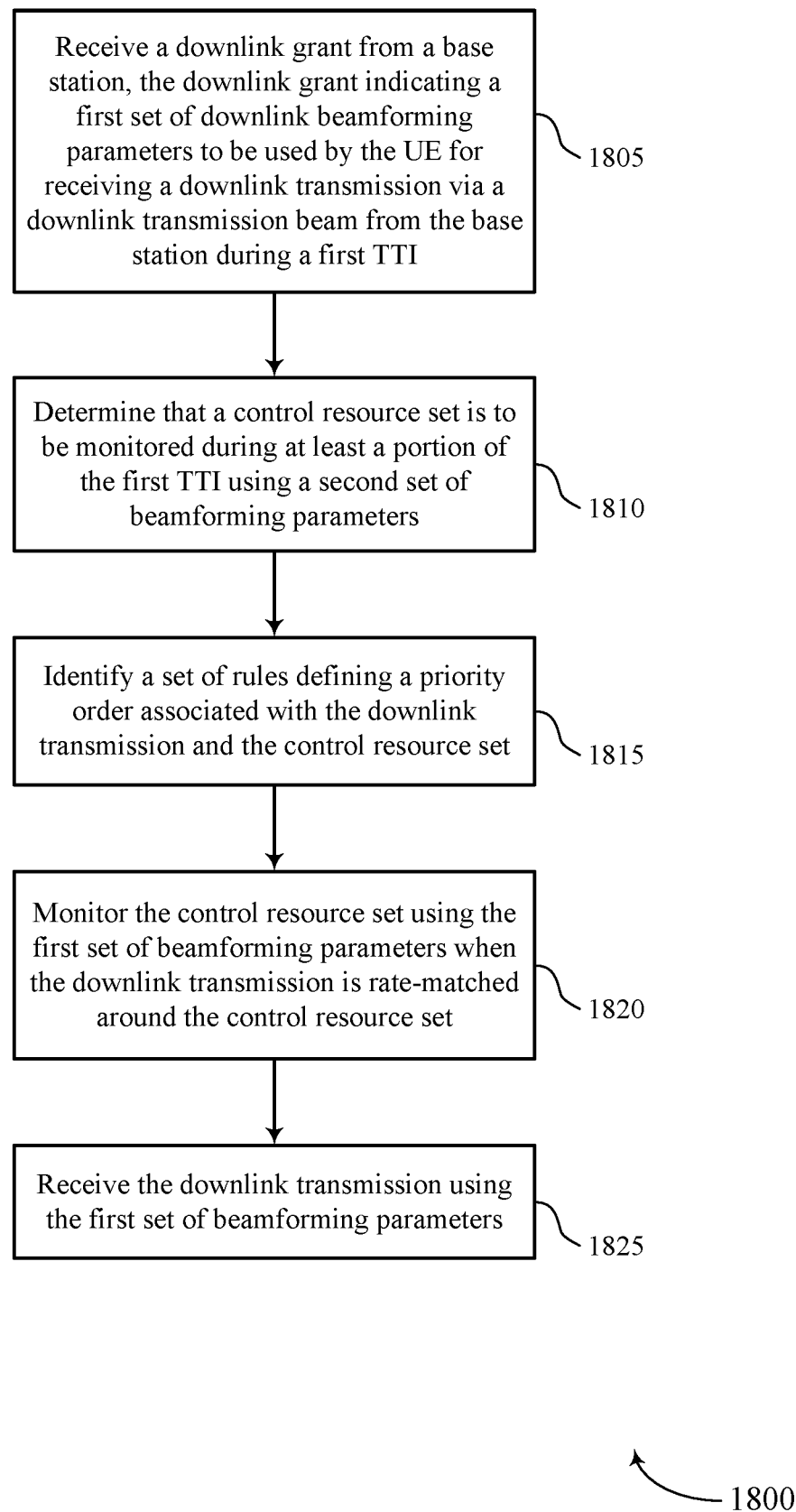

FIG. 18 shows a flowchart illustrating a method 1800 for downlink transmission beam configuration techniques for wireless communications in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive a downlink grant from a base station 105, the downlink grant indicating a first set of downlink beamforming parameters to be used by the UE for receiving a downlink transmission via a downlink transmission beam from the base station 105 during a first transmission time interval (TTI). The operations of 1805 may be performed according to the methods described herein. In certain examples, aspects of the operations of 1805 may be performed by a beamforming component as described with reference to FIGS. 9 through 12.

At 1810 the UE 115 may determine that a control resource set is to be monitored during at least a portion of the first TTI using a second set of beamforming parameters. The operations of 1810 may be performed according to the methods described herein. In certain examples, aspects of the operations of 1810 may be performed by a CORESET manager as described with reference to FIGS. 9 through 12.

At 1815 the UE 115 may identify a set of rules defining a priority order associated with the downlink transmission and the control resource set. The operations of 1815 may be performed according to the methods described herein. In certain examples, aspects of the operations of 1815 may be performed by a receive beam manager as described with reference to FIGS. 9 through 12. In some cases, the set of rules define whether the downlink transmission is rate-matched around the control resource set.

At 1820 the UE 115 may monitor the control resource set using the first set of beamforming parameters when the downlink transmission is determined to be rate-matched around the control resource set. The operations of 1820 may be performed according to the methods described herein. In certain examples, aspects of the operations of 1820 may be performed by a rate-matching component as described with reference to FIGS. 9 through 12.

At 1825 the UE 115 may receive the downlink transmission using the first set of beamforming parameters. The operations of 1825 may be performed according to the methods described herein. In certain examples, aspects of the operations of 1825 may be performed by a receive beam manager as described with reference to FIGS. 9 through 12.

Figure 19:
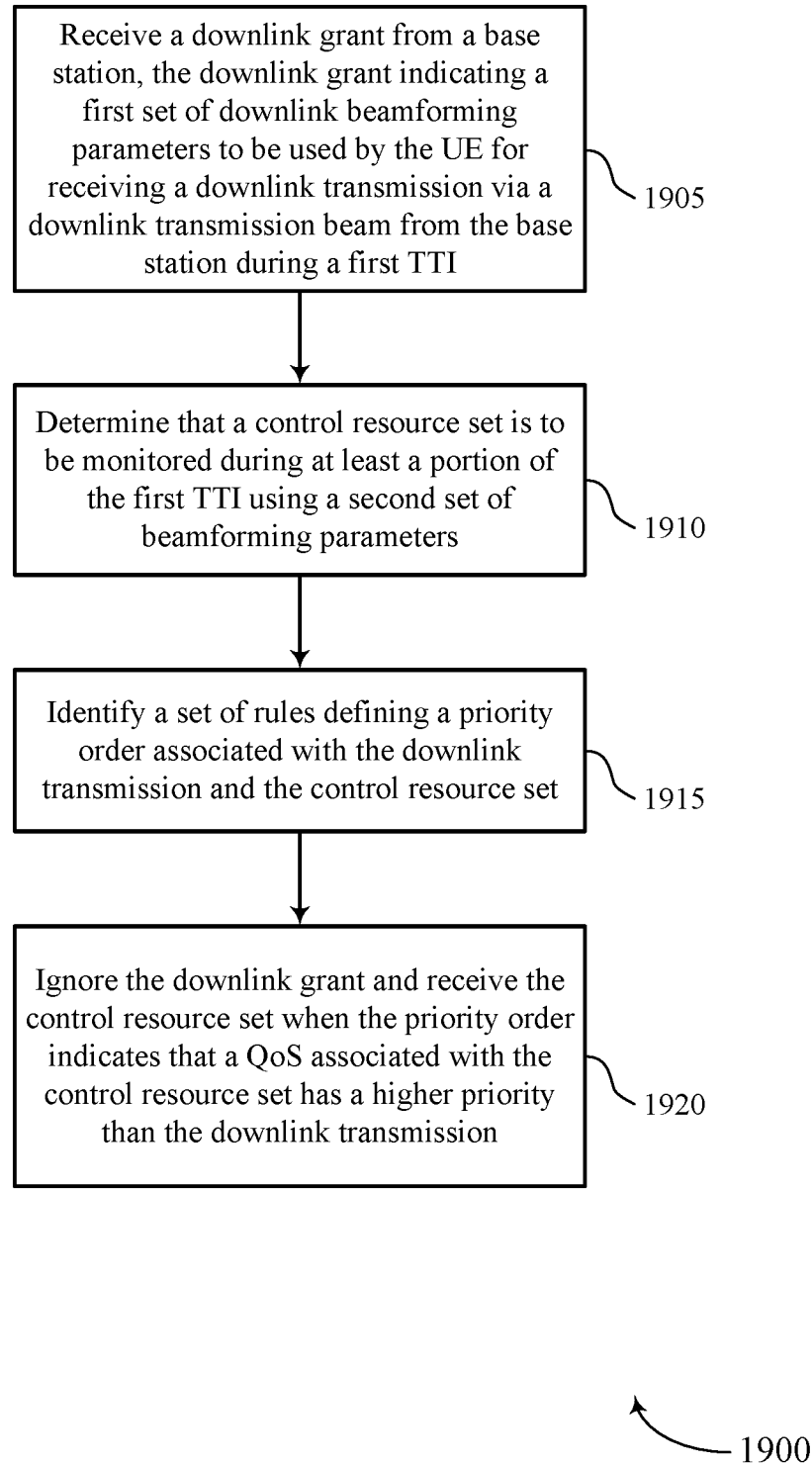

FIG. 19 shows a flowchart illustrating a method 1900 for downlink transmission beam configuration techniques for wireless communications in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive a downlink grant from a base station 105, the downlink grant indicating a first set of downlink beamforming parameters to be used by the UE for receiving a downlink transmission via a downlink transmission beam from the base station 105 during a first transmission time interval (TTI). The operations of 1905 may be performed according to the methods described herein. In certain examples, aspects of the operations of 1905 may be performed by a beamforming component as described with reference to FIGS. 9 through 12.

At 1910 the UE 115 may determine that a control resource set is to be monitored during at least a portion of the first TTI using a second set of beamforming parameters. The operations of 1910 may be performed according to the methods described herein. In certain examples, aspects of the operations of 1910 may be performed by a CORESET manager as described with reference to FIGS. 9 through 12.

At 1915 the UE 115 may identify a set of rules defining a priority order associated with the downlink transmission and the control resource set. The operations of 1915 may be performed according to the methods described herein. In certain examples, aspects of the operations of 1915 may be performed by a receive beam manager as described with reference to FIGS. 9 through 12.

At 1920 the UE 115 may ignore the downlink grant and receiving the control resource set when the priority order indicates that a QoS associated with the control resource set has a higher priority than the downlink transmission. The operations of 1920 may be performed according to the methods described herein. In certain examples, aspects of the operations of 1920 may be performed by a receive beam manager as described with reference to FIGS. 9 through 12.

Figure 20:
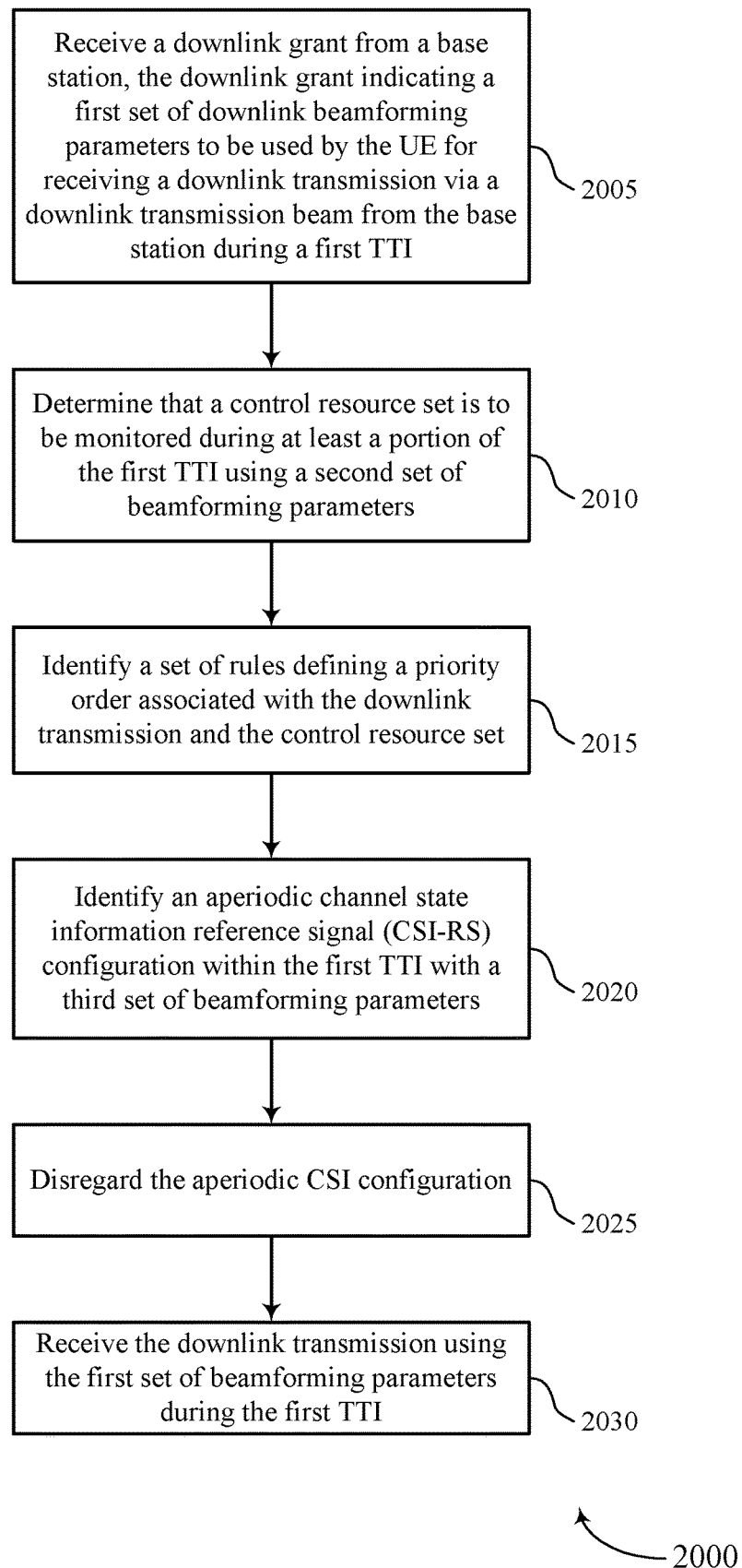

FIG. 20 shows a flowchart illustrating a method 2000 for downlink transmission beam configuration techniques for wireless communications in accordance with aspects of the present disclosure. The operations of method 2000 may be implemented by a UE 115 or its components as described herein. For example, the operations of method 2000 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may receive a downlink grant from a base station 105, the downlink grant indicating a first set of downlink beamforming parameters to be used by the UE for receiving a downlink transmission via a downlink transmission beam from the base station 105 during a first transmission time interval (TTI). The operations of 2005 may be performed according to the methods described herein. In certain examples, aspects of the operations of 2005 may be performed by a beamforming component as described with reference to FIGS. 9 through 12.

At 2010 the UE 115 may determine that a control resource set is to be monitored during at least a portion of the first TTI using a second set of beamforming parameters. The operations of 2010 may be performed according to the methods described herein. In certain examples, aspects of the operations of 2010 may be performed by a CORESET manager as described with reference to FIGS. 9 through 12.

At 2015 the UE 115 may identify a set of rules defining a priority order associated with the downlink transmission and the control resource set. The operations of 2015 may be performed according to the methods described herein. In certain examples, aspects of the operations of 2015 may be performed by a receive beam manager as described with reference to FIGS. 9 through 12.

At 2020 the UE 115 may identify an aperiodic CSI-RS configuration within the first TTI with a third set of beamforming parameters. The operations of 2020 may be performed according to the methods described herein. In certain examples, aspects of the operations of 2020 may be performed by a reference signal manager as described with reference to FIGS. 9 through 12.

At 2025 the UE 115 may disregard the aperiodic CSI configuration. The operations of 2025 may be performed according to the methods described herein. In certain examples, aspects of the operations of 2025 may be performed by a reference signal manager as described with reference to FIGS. 9 through 12.

At 2030 the UE 115 may receive the downlink transmission using the first set of beamforming parameters during the first TTI. The operations of 2030 may be performed according to the methods described herein. In certain examples, aspects of the operations of 2030 may be performed by a reference signal manager as described with reference to FIGS. 9 through 12.

Figure 21:
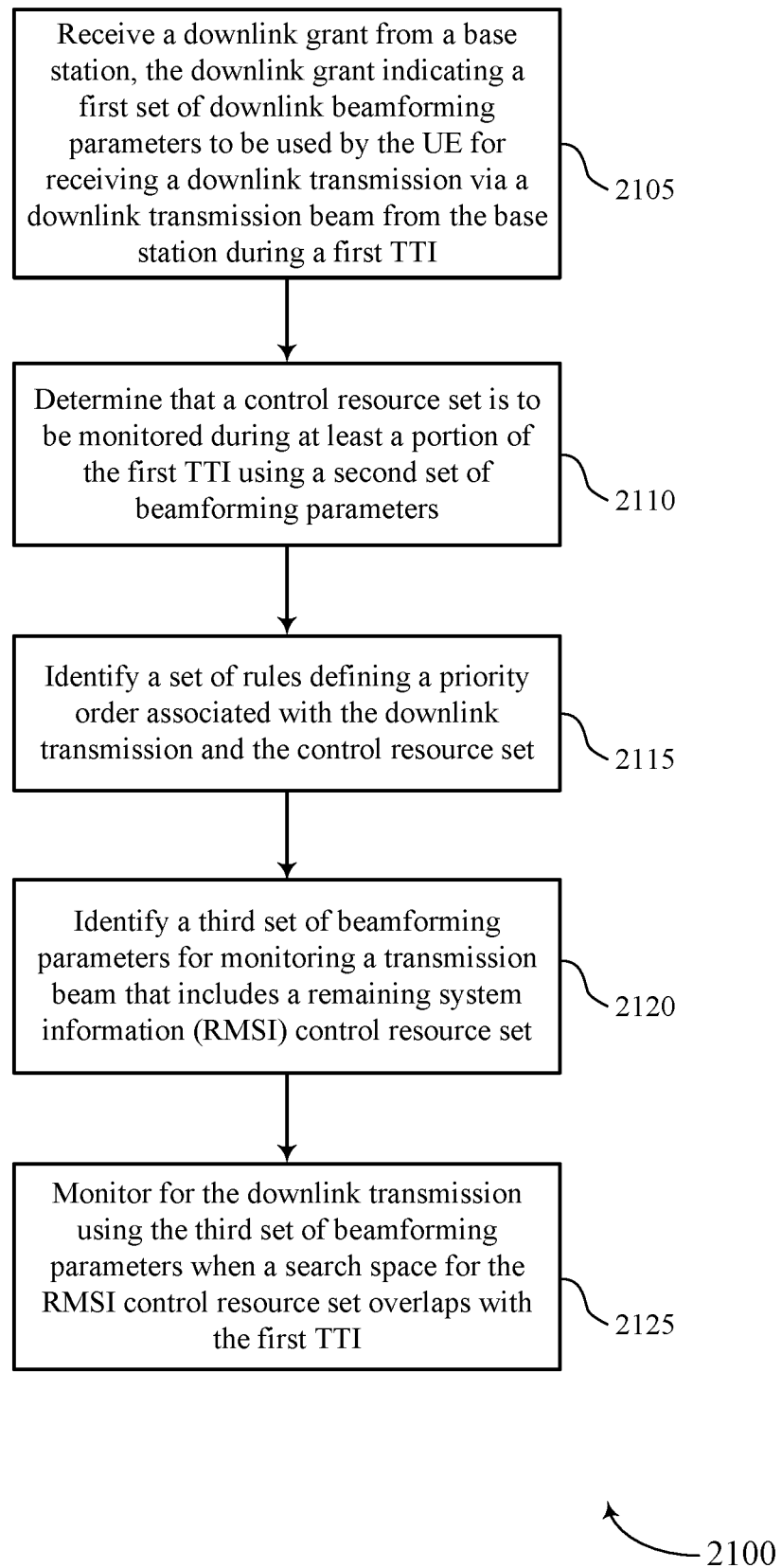

FIG. 21 shows a flowchart illustrating a method 2100 for downlink transmission beam configuration techniques for wireless communications in accordance with aspects of the present disclosure. The operations of method 2100 may be implemented by a UE 115 or its components as described herein. For example, the operations of method 2100 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may receive a downlink grant from a base station 105, the downlink grant indicating a first set of downlink beamforming parameters to be used by the UE 115 for receiving a downlink transmission via a downlink transmission beam from the base station 105 during a first transmission time interval (TTI). The operations of 2105 may be performed according to the methods described herein. In certain examples, aspects of the operations of 2105 may be performed by a beamforming component as described with reference to FIGS. 9 through 12.

At 2110 the UE 115 may determine that a control resource set is to be monitored during at least a portion of the first TTI using a second set of beamforming parameters. The operations of 2110 may be performed according to the methods described herein. In certain examples, aspects of the operations of 2110 may be performed by a CORESET manager as described with reference to FIGS. 9 through 12.

At 2115 the UE 115 may identify a set of rules defining a priority order associated with the downlink transmission and the control resource set. The operations of 2115 may be performed according to the methods described herein. In certain examples, aspects of the operations of 2115 may be performed by a receive beam manager as described with reference to FIGS. 9 through 12.

At 2120 the UE 115 may identify a third set of beamforming parameters for monitoring a transmission beam that includes a remaining system information (RMSI) control resource set. The operations of 2120 may be performed according to the methods described herein. In certain examples, aspects of the operations of 2120 may be performed by a beamforming component as described with reference to FIGS. 9 through 12.

At 2125 the UE 115 may monitor for the downlink transmission using the third set of beamforming parameters when a search space for the RMSI control resource set overlaps with the first TTI. The operations of 2125 may be performed according to the methods described herein. In certain examples, aspects of the operations of 2125 may be performed by a reference signal manager as described with reference to FIGS. 9 through 12.

Figure 22:
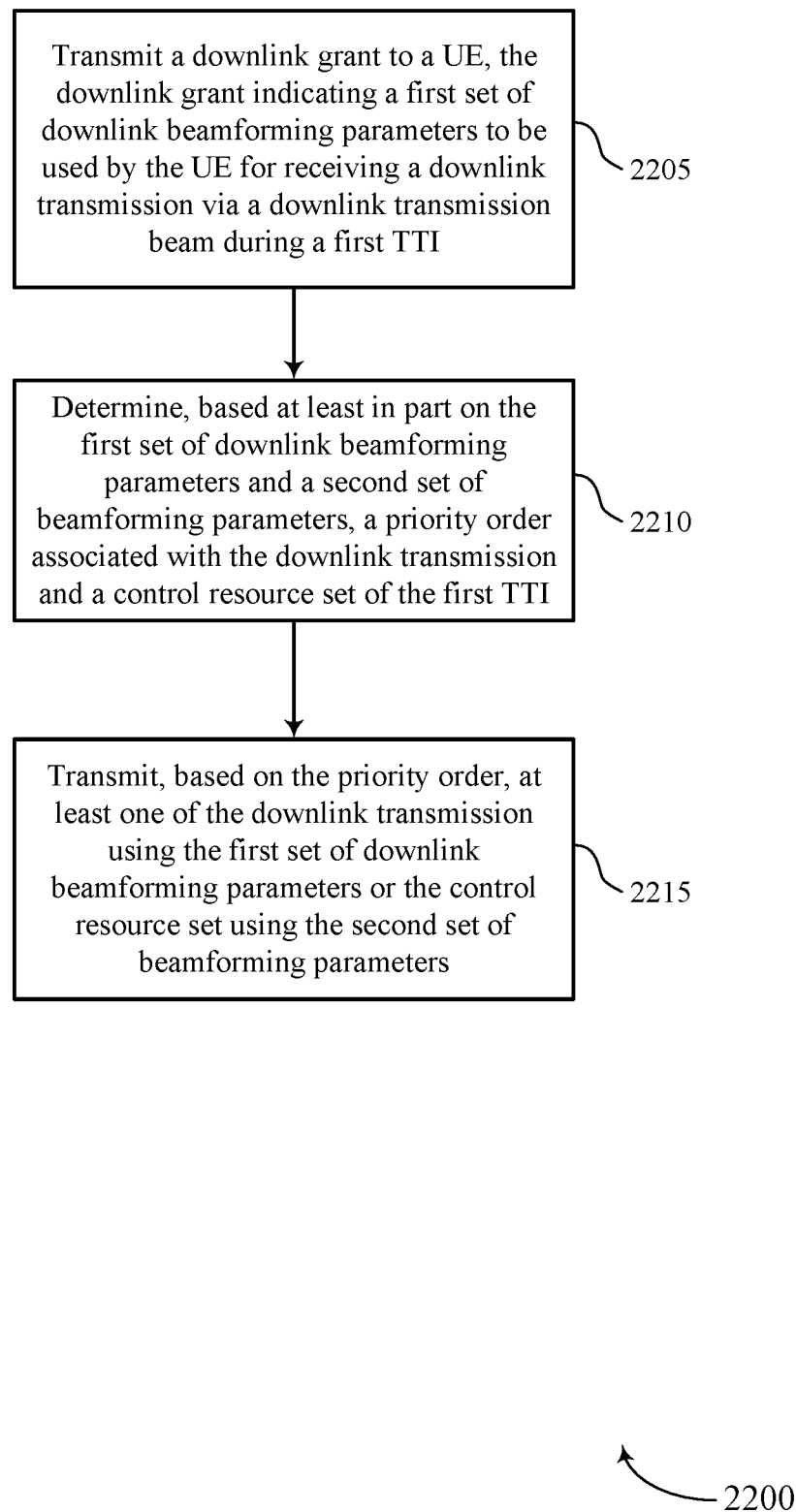

FIG. 22 shows a flowchart illustrating a method 2200 for downlink transmission beam configuration techniques for wireless communications in accordance with aspects of the present disclosure. The operations of method 2200 may be implemented by a base station 105 or its components as described herein. For example, the operations of method 2200 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may transmit a downlink grant to a user equipment (UE), the downlink grant indicating a first set of beamforming parameters to be used by the UE 115 for receiving a downlink transmission via a downlink transmission beam during a first transmission time interval (TTI). The operations of 2205 may be performed according to the methods described herein. In certain examples, aspects of the operations of 2205 may be performed by a beamforming component as described with reference to FIGS. 13 through 16.

At 2210 the base station 105 may determine, based at least in part on the first set of beamforming parameters and a second set of beamforming parameters, a priority order associated with the downlink transmission and a control resource set of the first TTI. The operations of 2210 may be performed according to the methods described herein. In certain examples, aspects of the operations of 2210 may be performed by a CORESET manager as described with reference to FIGS. 13 through 16.

At 2215 the base station 105 may transmit, based at least in part on the priority order, at least one of the downlink transmission using the first set of beamforming parameters or the control resource set using the second set of beamforming parameters. The operations of 2215 may be performed according to the methods described herein. In certain examples, aspects of the operations of 2215 may be performed by a transmission beam manager as described with reference to FIGS. 13 through 16.

Figure 23:
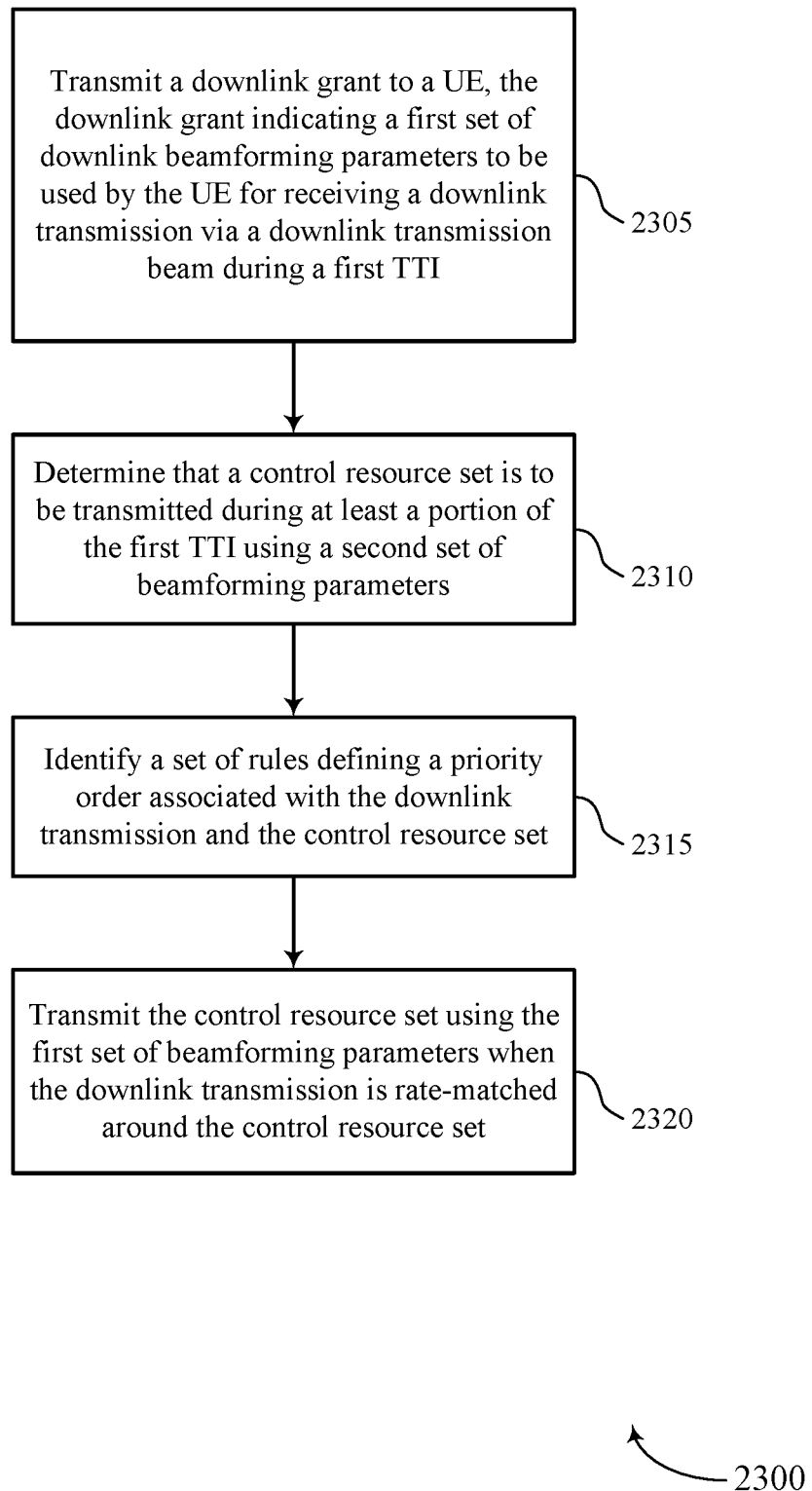

FIG. 23 shows a flowchart illustrating a method 2300 for downlink transmission beam configuration techniques for wireless communications in accordance with aspects of the present disclosure. The operations of method 2300 may be implemented by a base station 105 or its components as described herein. For example, the operations of method 2300 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2305 the base station 105 may transmit a downlink grant to a UE 115, the downlink grant indicating a first set of downlink beamforming parameters to be used by the UE 115 for receiving a downlink transmission via a downlink transmission beam during a first transmission time interval (TTI). The operations of 2305 may be performed according to the methods described herein. In certain examples, aspects of the operations of 2305 may be performed by a beamforming component as described with reference to FIGS. 13 through 16.

At 2310 the base station 105 may determine that a control resource set is to be transmitted during at least a portion of the first TTI using a second set of beamforming parameters. The operations of 2310 may be performed according to the methods described herein. In certain examples, aspects of the operations of 2310 may be performed by a CORESET manager as described with reference to FIGS. 13 through 16.

At 2315 the base station 105 may identify a set of rules defining a priority order associated with the downlink transmission and the control resource set. The operations of 2315 may be performed according to the methods described herein. In certain examples, aspects of the operations of 2315 may be performed by a priority order component as described with reference to FIGS. 13 through 16. In some cases, the set of rules defining the priority order indicate whether the downlink transmission is rate-matched around the control resource set.

At 2320 the base station 105 may transmit the control resource set using the first set of beamforming parameters when the downlink transmission is rate-matched around the control resource set. The operations of 2320 may be performed according to the methods described herein. In certain examples, aspects of the operations of 2320 may be performed by a rate-matching component as described with reference to FIGS. 13 through 16.

Figure 24:
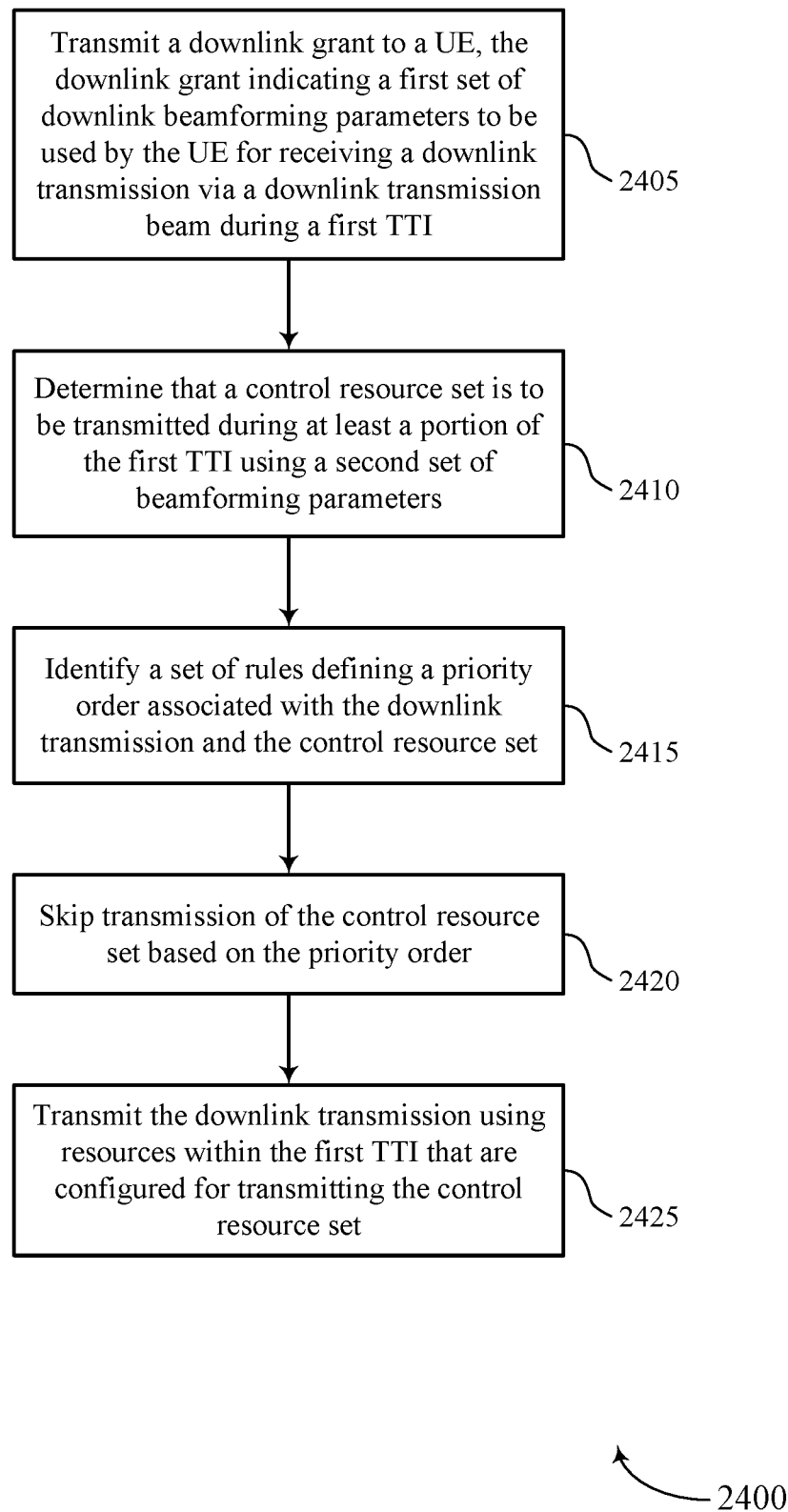

FIG. 24 shows a flowchart illustrating a method 2400 for downlink transmission beam configuration techniques for wireless communications in accordance with aspects of the present disclosure. The operations of method 2400 may be implemented by a base station 105 or its components as described herein. For example, the operations of method 2400 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2405 the base station 105 may transmit a downlink grant to a UE 115, the downlink grant indicating a first set of downlink beamforming parameters to be used by the UE 115 for receiving a downlink transmission via a downlink transmission beam during a first transmission time interval (TTI). The operations of 2405 may be performed according to the methods described herein. In certain examples, aspects of the operations of 2405 may be performed by a beamforming component as described with reference to FIGS. 13 through 16.

At 2410 the base station 105 may determine that a control resource set is to be transmitted during at least a portion of the first TTI using a second set of beamforming parameters. The operations of 2410 may be performed according to the methods described herein. In certain examples, aspects of the operations of 2410 may be performed by a CORESET manager as described with reference to FIGS. 13 through 16.

At 2415 the base station 105 may identify a set of rules defining a priority order associated with the downlink transmission and the control resource set. The operations of 2415 may be performed according to the methods described herein. In certain examples, aspects of the operations of 2415 may be performed by a priority order component as described with reference to FIGS. 13 through 16.

At 2420 the base station 105 may skip transmission of the control resource set based on the priority order. The operations of 2420 may be performed according to the methods described herein. In certain examples, aspects of the operations of 2420 may be performed by a CORESET manager as described with reference to FIGS. 13 through 16.

At 2425 the base station 105 may transmit the downlink transmission using resources within the first TTI that are configured for transmitting the control resource set. The operations of 2425 may be performed according to the methods described herein. In certain examples, aspects of the operations of 2425 may be performed by a transmission beam manager as described with reference to FIGS. 13 through 16.

Figure 25:
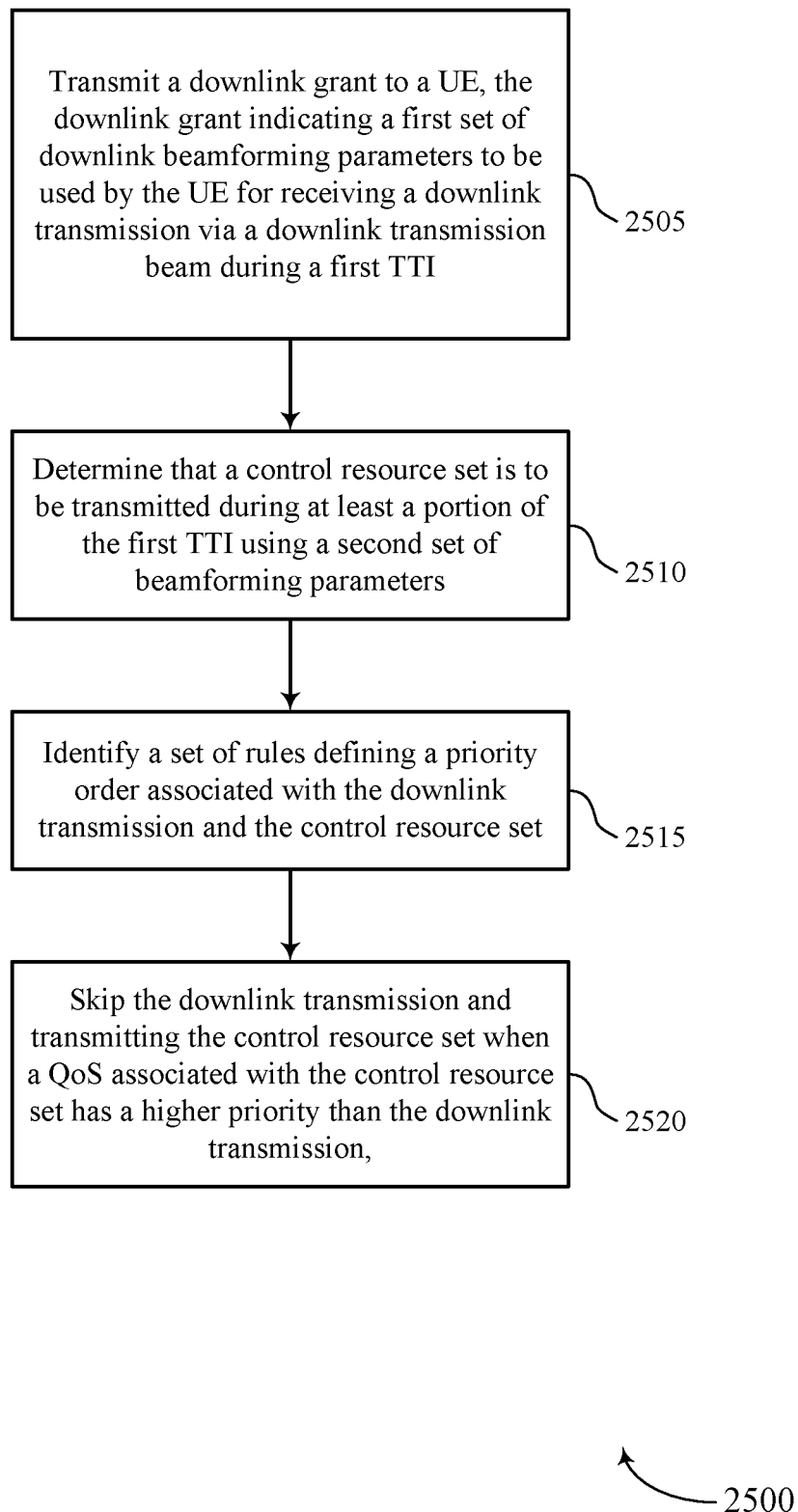

FIG. 25 shows a flowchart illustrating a method 2500 for downlink transmission beam configuration techniques for wireless communications in accordance with aspects of the present disclosure. The operations of method 2400 may be implemented by a base station 105 or its components as described herein. For example, the operations of method 2400 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2505 the base station 105 may transmit a downlink grant to a UE 115, the downlink grant indicating a first set of downlink beamforming parameters to be used by the UE 115 for receiving a downlink transmission via a downlink transmission beam during a first transmission time interval (TTI). The operations of 2505 may be performed according to the methods described herein. In certain examples, aspects of the operations of 2505 may be performed by a beamforming component as described with reference to FIGS. 13 through 16.

At 2510 the base station 105 may determine that a control resource set is to be transmitted during at least a portion of the first TTI using a second set of beamforming parameters. The operations of 2510 may be performed according to the methods described herein. In certain examples, aspects of the operations of 2510 may be performed by a CORESET manager as described with reference to FIGS. 13 through 16.

At 2515 the base station 105 may identify a set of rules defining a priority order associated with the downlink transmission and the control resource set. The operations of 2515 may be performed according to the methods described herein. In certain examples, aspects of the operations of 2515 may be performed by a priority order component as described with reference to FIGS. 13 through 16.

At 2520 the base station 105 may skip the downlink transmission and transmitting the control resource set when a QoS associated with the control resource set has a higher priority than the downlink transmission. The operations of 2520 may be performed according to the methods described herein. In certain examples, aspects of the operations of 2520 may be performed by a transmission beam manager as described with reference to FIGS. 13 through 16.

Figure 26:
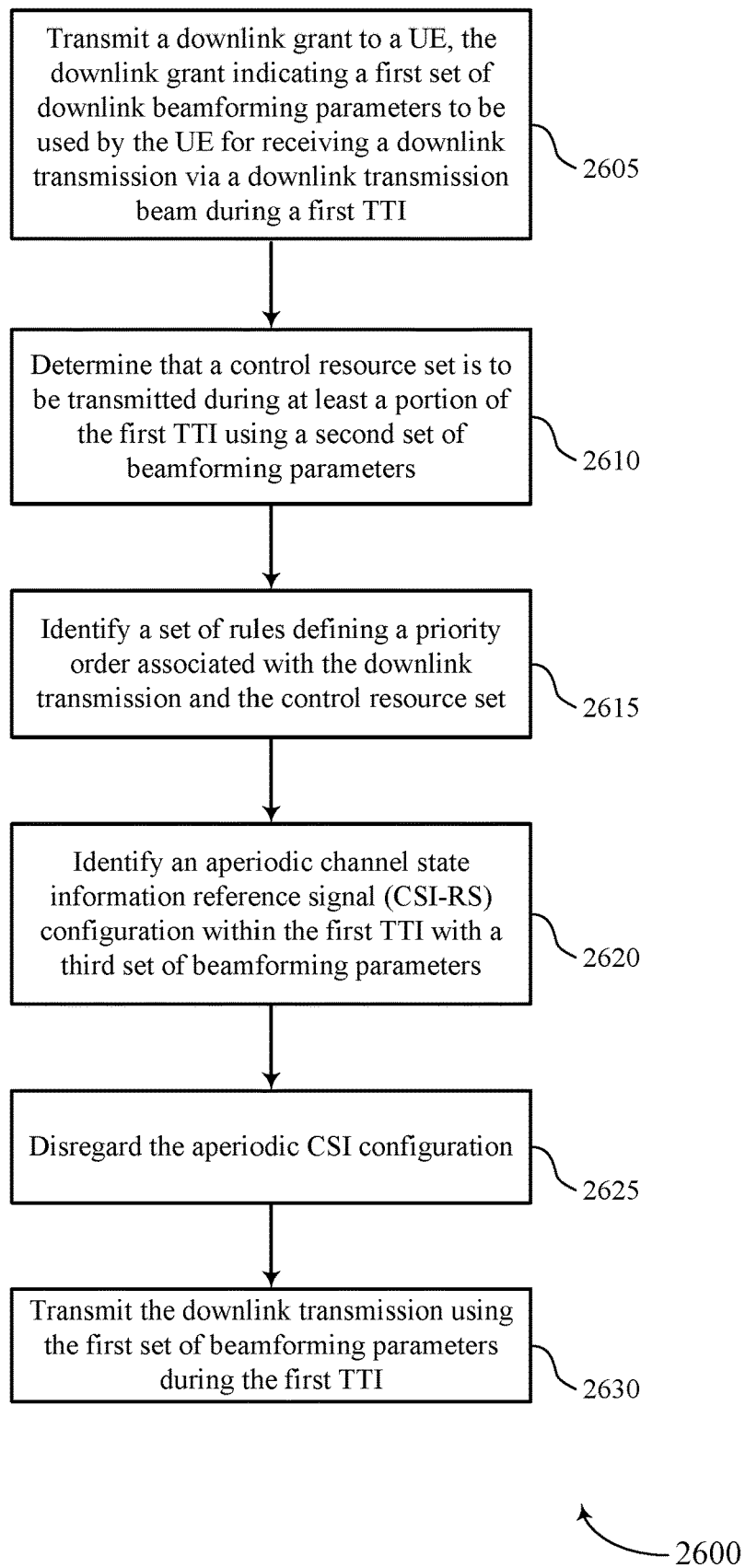

FIG. 26 shows a flowchart illustrating a method 2600 for downlink transmission beam configuration techniques for wireless communications in accordance with aspects of the present disclosure. The operations of method 2600 may be implemented by a base station 105 or its components as described herein. For example, the operations of method 2600 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2605 the base station 105 may transmit a downlink grant to a UE 115, the downlink grant indicating a first set of downlink beamforming parameters to be used by the UE 115 for receiving a downlink transmission via a downlink transmission beam during a first transmission time interval (TTI). The operations of 2605 may be performed according to the methods described herein. In certain examples, aspects of the operations of 2605 may be performed by a beamforming component as described with reference to FIGS. 13 through 16.

At 2610 the base station 105 may determine that a control resource set is to be transmitted during at least a portion of the first TTI using a second set of beamforming parameters. The operations of 2610 may be performed according to the methods described herein. In certain examples, aspects of the operations of 2610 may be performed by a CORESET manager as described with reference to FIGS. 13 through 16.

At 2615 the base station 105 may identify a set of rules defining a priority order associated with the downlink transmission and the control resource set. The operations of 2615 may be performed according to the methods described herein. In certain examples, aspects of the operations of 2615 may be performed by a priority order component as described with reference to FIGS. 13 through 16.

At 2620 the base station 105 may identify an aperiodic CSI-RS configuration within the first TTI with a third set of beamforming parameters. The operations of 2620 may be performed according to the methods described herein. In certain examples, aspects of the operations of 2620 may be performed by a reference signal manager as described with reference to FIGS. 13 through 16.

At 2625 the base station 105 may disregard the aperiodic CSI configuration. The operations of 2625 may be performed according to the methods described herein. In certain examples, aspects of the operations of 2625 may be performed by a reference signal manager as described with reference to FIGS. 13 through 16.

At 2630 the base station 105 may transmit the downlink transmission using the first set of beamforming parameters during the first TTI. The operations of 2630 may be performed according to the methods described herein. In certain examples, aspects of the operations of 2630 may be performed by a reference signal manager as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), a downlink grant from a base station, the downlink grant indicating a first set of beamforming parameters to be used by the UE for receiving a downlink transmission via a downlink transmission beam from the base station during a first transmission time interval (TTI);
   determining, based at least in part on the first set of beamforming parameters and a second set of beamforming parameters, a priority order associated with the downlink transmission and a control resource set of the first TTI; and
   receiving, based at least in part on the priority order, at least one of the downlink transmission using the first set of beamforming parameters or the control resource set using the second set of beamforming parameters.

2. The method of claim 1, further comprising:
   determining that the control resource set is to be monitored during at least a portion of the first TTI using the second set of beamforming parameters.

3. The method of claim 1, wherein receiving at least one of the downlink transmission or the control resource set comprises ignoring the downlink grant and receiving the control resource set based at least in part on the priority order.

4. The method of claim 1, wherein the priority order is determined based at least in part on a radio network temporary identifier (RNTI) that is monitored by the UE.

5. The method of claim 1, wherein the priority order is determined based at least in part on at least one of one or more downlink resources for the downlink transmission and at least one of one or more downlink resources of the control resource set residing within a same orthogonal frequency division multiplexing (OFDM) symbol.

6. The method of claim 1, wherein the priority order indicates that the control resource set has a higher priority than the downlink transmission.

7. The method of claim 6, wherein the priority order indicates that the control resource set has the higher priority based at least in part on a quality of service (QoS) associated with the control resource set having a higher priority than the downlink transmission, and wherein the QoS associated with the control resource set is an ultra-reliable low latency communication (URLLC) QoS, and wherein a QoS associated with the downlink transmission has a lower priority than the URLLC QoS.

8. The method of claim 1, further comprising:
determining that the first set of beamforming parameters or the second set of beamforming parameters are to be used for spatial receive beam filtering.

9. The method of claim 1, further comprising:
determining whether the downlink transmission is rate-matched around the control resource set.

10. The method of claim 9, wherein, when the downlink transmission is determined to be rate-matched around the control resource set, receiving at least one of the downlink transmission or the control resource set comprises:
monitoring the control resource set using the first set of beamforming parameters; and
receiving the downlink transmission using the first set of beamforming parameters.

11. The method of claim 1, wherein receiving at least one of the downlink transmission or the control resource set comprises:
identifying a subset of resources within the first TTI that are configured for transmitting the control resource set; and
receiving the downlink transmission during the first TTI using the subset of resources that are configured for transmitting the control resource set.

12. The method of claim 1, wherein the priority order is determined based at least in part on one or more of a type of transmission associated with the control resource set, frequency division multiplexing between downlink resources for the downlink transmission and downlink resources of the control resource set, a capability of the UE to concurrently receive multiple transmission beams, or any combination thereof.

13. The method of claim 1, further comprising:
identifying two or more different control resource sets configured by the base station, each of the two or more different control resource sets having a different priority in the priority order.

14. The method of claim 13, wherein a first control resource set of the two or more different control resource sets corresponds to transmissions of an ultra-reliable low latency communication (URLLC) service and has a higher priority than the downlink transmission, and a second control resource set of the two or more different control resource sets corresponds to transmissions of an enhanced mobile broadband (eMBB) service and has a lower priority than the downlink transmission.

15. The method of claim 1, further comprising:
identifying an aperiodic channel state information reference signal (CSI-RS) configuration within the first TTI with a third set of beamforming parameters;
disregarding the aperiodic CSI-RS configuration; and
receiving the downlink transmission using the first set of beamforming parameters during the first TTI.

16. The method of claim 1, further comprising:
identifying a third set of beamforming parameters for monitoring a transmission beam that includes a remaining system information (RMSI) control resource set; and
monitoring for the downlink transmission using the third set of beamforming parameters when a search space for the RMSI control resource set overlaps with the first TTI.

17. The method of claim 1, wherein a set of rules defining the priority order are statically defined at the UE.

18. The method of claim 1, wherein a set of rules defining the priority order are received semi-statically via radio resource control signaling.

19. A method for wireless communication, comprising:
transmitting a downlink grant to a user equipment (UE), the downlink grant indicating a first set of beamforming parameters to be used by the UE for receiving a downlink transmission via a downlink transmission beam during a first transmission time interval (TTI);
determining, based at least in part on the first set of beamforming parameters and a second set of beamforming parameters, a priority order associated with the downlink transmission and a control resource set of the first TTI; and
transmitting, based at least in part on the priority order, at least one of the downlink transmission using the first set of beamforming parameters or the control resource set using the second set of beamforming parameters.

20. The method of claim 19, further comprising:
determining that the control resource set is to be transmitted during at least a portion of the first TTI using the second set of beamforming parameters.

21. The method of claim 19, wherein transmitting at least one of the downlink transmission or the control resource set comprises skipping transmission of the downlink grant and transmitting the control resource set based at least in part on the priority order.

22. The method of claim 19, wherein the priority order is determined based at least in part on a radio network temporary identifier (RNTI) that is to be monitored by the UE.

23. The method of claim 19, wherein the priority order is determined based at least in part on at least one of one or more downlink resources for the downlink transmission and at least one of one or more downlink resources of the control resource set residing within a same orthogonal frequency division multiplexing (OFDM) symbol.

24. The method of claim 19, wherein the priority order indicates that the control resource set has a higher priority than the downlink transmission.

25. The method of claim 24, wherein the priority order indicates that the control resource set has the higher priority based at least in part on a quality of service (QoS) associated with the control resource set having a higher priority than the downlink transmission, and wherein the QoS associated with the control resource set is an ultra-reliable low latency communication (URLLC) QoS, and wherein a QoS associated with the downlink transmission has a lower priority than the URLLC QoS.

26. The method of claim 19, wherein the priority order indicates which of the first set of beamforming parameters or the second set of beamforming parameters are to be used for spatial receive beam filtering.

27. The method of claim 19, wherein the priority order indicates whether the downlink transmission is to be rate-matched around the control resource set.

28. The method of claim 27, wherein, when the downlink transmission is rate-matched around the control resource set, the method further comprises:
transmitting the control resource set using the first set of beamforming parameters.

29. The method of claim 19, wherein the transmitting at least one of the downlink transmission or the control resource set comprises:
skipping transmission of the control resource set; and transmitting the downlink transmission using resources within the first TTI that are configured for transmitting the control resource set.

30. The method of claim 19, wherein the priority order is determined based at least in part on one or more of a type of transmission associated with the control resource set, frequency division multiplexing between downlink resources for the downlink transmission and resources of the control resource set, a capability of the UE to concurrently receive multiple transmission beams, or any combination thereof.

31. The method of claim 19, further comprising:
identifying two or more different control resource sets having a different priority in the priority order.

32. The method of claim 31, wherein a first control resource set of the two or more different control resource sets corresponds to transmissions of an ultra-reliable low latency communication (URLLC) service and has a higher priority than the downlink transmission, and a second control resource set of the two or more different control resource sets corresponds to transmissions of an enhanced mobile broadband (eMBB) service and has a lower priority than the downlink transmission.

33. The method of claim 19, further comprising:
identifying an aperiodic channel state information reference signal (CSI-RS) configuration within the first TTI with a third set of beamforming parameters;
disregarding the aperiodic CSI-RS configuration; and
transmitting the downlink transmission using the first set of beamforming parameters during the first TTI.

34. The method of claim 19, further comprising:
identifying a third set of beamforming parameters for a transmission beam that includes a remaining system information (RMSI) control resource set; and
transmitting the downlink transmission using the third set of beamforming parameters when a search space for the RMSI control resource set overlaps with the first TTI.

35. The method of claim 19, wherein a set of rules defining the priority order are statically defined or are transmitted semi-statically via radio resource control signaling.

36. An apparatus for wireless communication, comprising:
a processor;
memory in electronic communication with the processor; and
instructions stored in the memory and executable by the processor to cause the apparatus to:
receive, at a user equipment (UE), a downlink grant from a base station, the downlink grant indicating a first set of beamforming parameters to be used by the UE for receiving a downlink transmission via a downlink transmission beam from the base station during a first transmission time interval (TTI);
determine, based at least in part on the first set of beamforming parameters and a second set of beamforming parameters, a priority order associated with the downlink transmission and a control resource set of the first TTI; and
receive, based at least in part on the priority order, at least one of the downlink transmission using the first set of beamforming parameters or the control resource set using the second set of beamforming parameters.

37. The apparatus of claim 36, wherein the instructions are further executable by the processor to cause the apparatus to:
determine that the control resource set is to be monitored during at least a portion of the first TTI using the second set of beamforming parameters.

38. The apparatus of claim 36, wherein the instructions to receive at least one of the downlink transmission or the control resource set are executable by the processor to cause the apparatus to:
ignore the downlink grant and receive the control resource set based at least in part on the priority order.

39. The apparatus of claim 36, wherein the instructions are further executable by the processor to cause the apparatus to:
determine the priority order based at least in part on a radio network temporary identifier (RNTI) that is monitored by the UE.

40. The apparatus of claim 36, wherein the instructions are further executable by the processor to cause the apparatus to:
determine the priority order based at least in part on at least one of one or more downlink resources for the downlink transmission and at least one of one or more downlink resources of the control resource set residing within a same orthogonal frequency division multiplexing (OFDM) symbol.

41. The apparatus of claim 36, wherein the priority order indicates that the control resource set has a higher priority than the downlink transmission.

42. The apparatus of claim 41, wherein the priority order indicates that the control resource set has the higher priority based at least in part on a quality of service (QoS) associated with the control resource set having a higher priority than the downlink transmission, and wherein the QoS associated with the control resource set is an ultra-reliable low latency communication (URLLC) QoS, and wherein a QoS associated with the downlink transmission has a lower priority than the URLLC QoS.

43. The apparatus of claim 36, wherein the instructions are further executable by the processor to cause the apparatus to:
determine that the first set of beamforming parameters or the second set of beamforming parameters are to be used for spatial receive beam filtering.

44. The apparatus of claim 36, wherein the instructions are further executable by the processor to cause the apparatus to:
determine whether the downlink transmission is rate-matched around the control resource set.

45. The apparatus of claim 44, wherein the instructions are further executable by the processor to cause the apparatus to:
monitor the control resource set using the first set of beamforming parameters when the downlink transmission is determined to be rate-matched around the control resource set; and
receive the downlink transmission using the first set of beamforming parameters.

46. The apparatus of claim 36, wherein the instructions to receive at least one of the downlink transmission or the control resource set are executable by the processor to cause the apparatus to:
identify a subset of resources within the first TTI that are configured for transmitting the control resource set; and
receive the downlink transmission during the first TTI using the subset of resources that are configured for transmitting the control resource set.

47. The apparatus of claim 36, wherein the instructions are further executable by the processor to cause the apparatus to:

identify two or more different control resource sets configured by the base station, each of the two or more different control resource sets having a different priority in the priority order.

48. The apparatus of claim 47, wherein a first control resource set of the two or more different control resource sets corresponds to transmissions of an ultra-reliable low latency communication (URLLC) service and has a higher priority than the downlink transmission, and a second control resource set of the two or more different control resource sets corresponds to transmissions of an enhanced mobile broadband (eMBB) service and has a lower priority than the downlink transmission.

49. The apparatus of claim 36, wherein the instructions are further executable by the processor to cause the apparatus to:

identify an aperiodic channel state information reference signal (CSI-RS) configuration within the first TTI with a third set of beamforming parameters;
disregard the aperiodic CSI-RS configuration; and
receive the downlink transmission using the first set of beamforming parameters during the first TTI.

50. The apparatus of claim 36, wherein the instructions are further executable by the processor to cause the apparatus to:

identify a third set of beamforming parameters for monitoring a transmission beam that includes a remaining system information (RMSI) control resource set; and
monitor for the downlink transmission using the third set of beamforming parameters when a search space for the RMSI control resource set overlaps with the first TTI.

51. An apparatus for wireless communication, comprising:

a processor;
memory in electronic communication with the processor; and
instructions stored in the memory and executable by the processor to cause the apparatus to:
transmit a downlink grant to a user equipment (UE), the downlink grant indicating a first set of beamforming parameters to be used by the UE for receiving a downlink transmission via a downlink transmission beam during a first transmission time interval (TTI);
determine, based at least in part on the first set of beamforming parameters and a second set of beamforming parameters, a priority order associated with the downlink transmission and a control resource set of the first TTI; and
transmit, based at least in part on the priority order, at least one of the downlink transmission using the first set of beamforming parameters or the control resource set using the second set of beamforming parameters.

52. The apparatus of claim 51, wherein the instructions are further executable by the processor to cause the apparatus to:

determine that the control resource set is to be transmitted during at least a portion of the first TTI using the second set of beamforming parameters.

53. The apparatus of claim 51, wherein the instructions to transmit at least one of the downlink transmission or the control resource set are further executable by the processor to cause the apparatus to:

skip transmission of the control resource set and transmit the downlink transmission using resources within the first TTI that are configured for transmitting the control resource set based at least in part on the priority order.

54. The apparatus of claim 51, wherein the instructions are further executable by the processor to cause the apparatus to:

determine the priority order based at least in part on a radio network temporary identifier (RNTI) that is to be monitored by the UE.

55. The apparatus of claim 51, wherein the instructions are further executable by the processor to cause the apparatus to:

determine the priority order based at least in part on at least one of one or more downlink resources for the downlink transmission and at least one of one or more downlink resources of the control resource set residing within a same orthogonal frequency division multiplexing (OFDM) symbol.

56. The apparatus of claim 51, wherein the priority order indicates that the control resource set has a higher priority than the downlink transmission.

57. The apparatus of claim 56, wherein the priority order indicates that the control resource set has the higher priority based at least in part on a quality of service (QoS) associated with the control resource set having a higher priority than the downlink transmission, and wherein the QoS associated with the control resource set is an ultra-reliable low latency communication (URLLC) QoS, and wherein a QoS associated with the downlink transmission has a lower priority than the URLLC QoS.

58. The apparatus of claim 51, wherein the priority order indicates which of the first set of beamforming parameters or the second set of beamforming parameters are to be used for spatial receive beam filtering.

59. The apparatus of claim 51, wherein the priority order indicates whether the downlink transmission is to be rate-matched around the control resource set.

60. The apparatus of claim 59, wherein the instructions are further executable by the processor to cause the apparatus to:

transmit the control resource set using the first set of beamforming parameters when the downlink transmission is rate-matched around the control resource set.

61. The apparatus of claim 51, wherein the instructions are further executable by the processor to cause the apparatus to:

skip transmission of the control resource set; and
transmit the downlink transmission using resources within the first TTI that are configured for transmitting the control resource set.

62. The apparatus of claim 51, wherein the instructions are further executable by the processor to cause the apparatus to:

skip the downlink transmission and transmitting the control resource set when a QoS associated with the control resource set has a higher priority than the downlink transmission.

63. The apparatus of claim 51, wherein the instructions are further executable by the processor to cause the apparatus to:

identify two or more different control resource sets having a different priority in the priority order.

64. The apparatus of claim 63, wherein a first control resource set of the two or more different control resource sets corresponds to transmissions of an ultra-reliable low latency communication (URLLC) service and has a higher priority than the downlink transmission, and a second control resource set of the two or more different control resource sets corresponds to transmissions of an enhanced mobile broadband (eMBB) service and has a lower priority than the downlink transmission.

65. The apparatus of claim 51, wherein the instructions are further executable by the processor to cause the apparatus to:
identify an aperiodic channel state information reference signal (CSI-RS) configuration within the first TTI with a third set of beamforming parameters;
disregard the aperiodic CSI-RS configuration; and
transmit the downlink transmission using the first set of beamforming parameters during the first TTI.

66. The apparatus of claim 51, wherein the instructions are further executable by the processor to cause the apparatus to:
identify a third set of beamforming parameters for a transmission beam that includes a remaining system information (RMSI) control resource set; and
transmit the downlink transmission using the third set of beamforming parameters when a search space for the RMSI control resource set overlaps with the first TTI.

67. An apparatus for wireless communication, comprising:
means for receiving, at a user equipment (UE), a downlink grant from a base station, the downlink grant indicating a first set of beamforming parameters to be used by the UE for receiving a downlink transmission via a downlink transmission beam from the base station during a first transmission time interval (TTI);
means for determining, based at least in part on the first set of beamforming parameters and a second set of beamforming parameters, a priority order associated with the downlink transmission and a control resource set of the first TTI; and
means for receiving, based at least in part on the priority order, at least one of the downlink transmission using the first set of beamforming parameters or the control resource set using the second set of beamforming parameters.

68. An apparatus for wireless communication, comprising:
means for transmitting a downlink grant to a user equipment (UE), the downlink grant indicating a first set of beamforming parameters to be used by the UE for receiving a downlink transmission via a downlink transmission beam during a first transmission time interval (TTI);
means for determining, based at least in part on the first set of beamforming parameters and a second set of beamforming parameters, a priority order associated with the downlink transmission and a control resource set of the first TTI; and
means for transmitting, based at least in part on the priority order, at least one of the downlink transmission using the first set of beamforming parameters or the control resource set using the second set of beamforming parameters.

* * * * *